(12) United States Patent
Vandike et al.

(10) Patent No.: US 12,708,070 B2
(45) Date of Patent: Aug. 18, 2026

(54) SYSTEMS AND METHODS FOR CORN HEAD CONTROL

(71) Applicant: Deere & Company, Moline, IL (US)

(72) Inventors: Nathan R. Vandike, Geneseo, IL (US); Troy M. Heims, Davenport, IA (US)

(73) Assignee: Deere & Company, Moline, IL (US)

( * ) Notice: Subject to any disclaimer, the term of this patent is extended or adjusted under 35 U.S.C. 154(b) by 309 days.

(21) Appl. No.: 18/192,394

(22) Filed: Mar. 29, 2023

(65) Prior Publication Data

US 2024/0324507 A1 Oct. 3, 2024

(51) Int. Cl.
*A01D 41/14* (2006.01)
*A01D 41/127* (2006.01)
*A01D 45/02* (2006.01)

(52) U.S. Cl.
CPC ....... *A01D 41/141* (2013.01); *A01D 41/1273* (2013.01); *A01D 41/1277* (2013.01); *A01D 45/021* (2013.01)

(58) Field of Classification Search
CPC .............. A01D 41/141; A01D 41/1273; A01D 41/1277; A01D 45/021
See application file for complete search history.

(56) References Cited

U.S. PATENT DOCUMENTS 8,469,784 B1 6/2013 Hoskinson et al.
9,867,334 B2 1/2018 Jongmanus et al.
10,829,033 B1 11/2020 McKinney et al.
2015/0327440 A1* 11/2015 Dybro .................... A01D 75/00 73/862.541
2018/0116112 A1* 5/2018 French, Jr. ........... A01D 41/127
2018/0139898 A1 5/2018 Shearer
2018/0213721 A1* 8/2018 Schmoening ...... A01D 41/1274
2019/0335661 A1 11/2019 Seiders
2020/0236853 A1 7/2020 Trowbridge
2020/0337240 A1 10/2020 Brimeyer et al.
2020/0359562 A1 11/2020 Hurt et al.
2020/0375092 A1* 12/2020 Pankaj ................ A01D 41/141
2020/0375107 A1 12/2020 Duerksen et al.
2020/0390035 A1 12/2020 Hunt et al.
2021/0059117 A1 3/2021 Hunt
(Continued)

FOREIGN PATENT DOCUMENTS

BR 102020026350 A2 7/2022
CN 111226603 A 6/2020
(Continued)

*Primary Examiner* — Scott A Browne
*Assistant Examiner* — Jason Nguyen
(74) *Attorney, Agent, or Firm* — Christopher J. Volkmann; KELLY, HOLT & CHRISTENSON PLLC

(57) ABSTRACT

A mobile agricultural corn harvester comprises a non-header portion and a header portion (or header). The mobile agricultural corn harvester further includes a material other than grain (MOG) intake characteristic sensor, disposed on the non-header portion, configured to detect MOG intake and generate sensor data indicative of MOG intake. The mobile agricultural harvester further includes a control system configured to determine a control action based on the sensor data and to generate an action signal to control a controllable subsystem, such as a deck plate actuator a header speed actuator, or a header position actuator, based on the determined control action.

16 Claims, 16 Drawing Sheets

(56) References Cited

U.S. PATENT DOCUMENTS

| | | | | |
|---|---|---|---|---|
| 2021/0102713 | A1 | 4/2021 | Kageyama et al. | |
| 2021/0120738 | A1 | 4/2021 | Ricketts et al. | |
| 2021/0185679 | A1 | 6/2021 | Hunt et al. | |
| 2021/0185877 | A1 | 6/2021 | Hunt et al. | |
| 2021/0185880 | A1 | 6/2021 | Martin et al. | |
| 2021/0185916 | A1 | 6/2021 | Hunt | |
| 2021/0185917 | A1 | 6/2021 | Hunt et al. | |
| 2021/0185919 | A1 | 6/2021 | Hunt | |
| 2021/0212246 | A1 | 7/2021 | Kong et al. | |
| 2021/0212254 | A1 | 7/2021 | Thomas et al. | |
| 2021/0235622 | A1 | 8/2021 | Baumgarten et al. | |
| 2021/0237982 | A1 | 8/2021 | Trowbridge et al. | |
| 2021/0243936 | A1* | 8/2021 | Vandike | G05D 1/0278 |
| 2021/0289702 | A1 | 9/2021 | Jung | |
| 2021/0289703 | A1 | 9/2021 | Hunt et al. | |
| 2021/0307234 | A1 | 10/2021 | Jongmans et al. | |
| 2021/0307235 | A1 | 10/2021 | Jongmans et al. | |
| 2021/0307248 | A1 | 10/2021 | Missotten et al. | |
| 2021/0307249 | A1 | 10/2021 | Jongmans et al. | |
| 2021/0329837 | A1 | 10/2021 | Schnaider et al. | |
| 2021/0392814 | A1 | 12/2021 | Verhoef et al. | |
| 2022/0000023 | A1 | 1/2022 | Du et al. | |
| 2022/0000024 | A1 | 1/2022 | Zielke et al. | |
| 2022/0053693 | A1 | 2/2022 | Gahres et al. | |
| 2022/0061218 | A1 | 3/2022 | Karst | |
| 2022/0071093 | A1 | 3/2022 | Risius | |
| 2022/0087101 | A1 | 3/2022 | Hunt et al. | |
| 2022/0113161 | A1* | 4/2022 | Vandike | B60K 35/28 |
| 2022/0117143 | A1 | 4/2022 | Kraus et al. | |
| 2022/0167556 | A1 | 6/2022 | Peters | |
| 2022/0183229 | A1 | 6/2022 | Hunt | |
| 2022/0225569 | A1 | 7/2022 | Zielke et al. | |
| 2022/0232770 | A1 | 7/2022 | Yanke et al. | |
| 2022/0240446 | A1 | 8/2022 | Martin | |
| 2022/0264798 | A1 | 8/2022 | Martin et al. | |
| 2022/0304228 | A1 | 9/2022 | Hunt et al. | |
| 2022/0312676 | A1 | 10/2022 | Reubens et al. | |
| 2022/0338416 | A1 | 10/2022 | Racchella et al. | |
| 2022/0354055 | A1* | 11/2022 | Hermann | A01D 61/008 |
| 2022/0354056 | A1 | 11/2022 | Hunt et al. | |
| 2022/0369556 | A1 | 11/2022 | Yanke et al. | |
| 2022/0369557 | A1 | 11/2022 | Hunt et al. | |
| 2022/0369558 | A1 | 11/2022 | Scharmann et al. | |
| 2022/0377978 | A1 | 12/2022 | Laugen et al. | |
| 2022/0394927 | A1 | 12/2022 | Seiders | |
| 2022/0394928 | A1 | 12/2022 | Seiders | |
| 2022/0400611 | A1 | 12/2022 | Missotten et al. | |
| 2024/0260509 | A1* | 8/2024 | Hunt | A01D 41/1271 |

FOREIGN PATENT DOCUMENTS

| | | | |
|---|---|---|---|
| CN | 111436276 | A | 7/2020 |
| CN | 111819993 | A | 10/2020 |
| CN | 111903317 | A | 11/2020 |
| CN | 111990062 | A | 11/2020 |
| CN | 212413857 | U | 1/2021 |
| CN | 212589003 | U | 2/2021 |
| CN | 112690089 | A | 4/2021 |
| CN | 113016358 | A | 6/2021 |
| CN | 113099836 | A | 7/2021 |
| CN | 113228939 | A | 8/2021 |
| CN | 113243194 | A | 8/2021 |
| CN | 113607096 | A | 11/2021 |
| CN | 113661827 | A | 11/2021 |
| CN | 214902224 | U | 11/2021 |
| CN | 113966667 | A | 1/2022 |
| CN | 114187353 | A | 3/2022 |
| CN | 114223386 | A | 3/2022 |
| CN | 114303621 | A | 4/2022 |
| CN | 114342665 | A | 4/2022 |
| CN | 114467504 | A | 5/2022 |
| CN | 114631426 | A | 6/2022 |
| CN | 216930906 | U | 7/2022 |
| CN | 114916306 | A | 8/2022 |
| CN | 115067062 | A | 9/2022 |
| IN | 202021036612 | A | 4/2022 |
| WO | 2021062552 | A1 | 4/2021 |
| WO | 2021123963 | A1 | 6/2021 |
| WO | 2021133756 | A1 | 7/2021 |
| WO | 2021217112 | A1 | 10/2021 |
| WO | 2021222592 | A1 | 11/2021 |
| WO | 2021242867 | A1 | 12/2021 |
| WO | 2022003457 | A1 | 1/2022 |
| WO | 2022040765 | A1 | 3/2022 |
| WO | 2022040769 | A1 | 3/2022 |
| WO | 2022077122 | A1 | 4/2022 |
| WO | 2022147601 | A1 | 7/2022 |
| WO | 2022212355 | A2 | 10/2022 |
| WO | 2022232244 | A1 | 11/2022 |
| WO | 2023278658 | A1 | 1/2023 |

* cited by examiner

SYSTEMS AND METHODS FOR CORN HEAD CONTROL

FIELD OF THE DESCRIPTION

The present descriptions relate to mobile agricultural machines, particularly mobile agricultural harvesting machines configured to harvest at a field.

BACKGROUND

There are a wide variety of different mobile agricultural machines. One such mobile agricultural machine is a mobile agricultural harvesting machine. The mobile agricultural harvesting machine can include a header, such as a corn header. The corn header includes a plurality of row units, each row unit includes crop processing functionality that gathers the corn towards the header, severs the stalk, and captures the corn cars. The corn cars are then conveyed further back into the agricultural harvesting machine for further processing.

The discussion above is merely provided for general background information and is not intended to be used as an aid in determining the scope of the claimed subject matter.

SUMMARY

A mobile agricultural harvester comprises a non-header portion and a header portion (or header). The mobile agricultural harvester further includes a material other than grain (MOG) intake characteristic sensor, disposed on the non-header portion, configured to detect MOG intake and generate sensor data indicative of MOG intake. The mobile agricultural harvester further includes a control system configured to determine a control action based on the sensor data and to generate an action signal to control a controllable subsystem, such as a deck plate actuator, a header speed actuator, or a header position actuator, based on the determined control action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
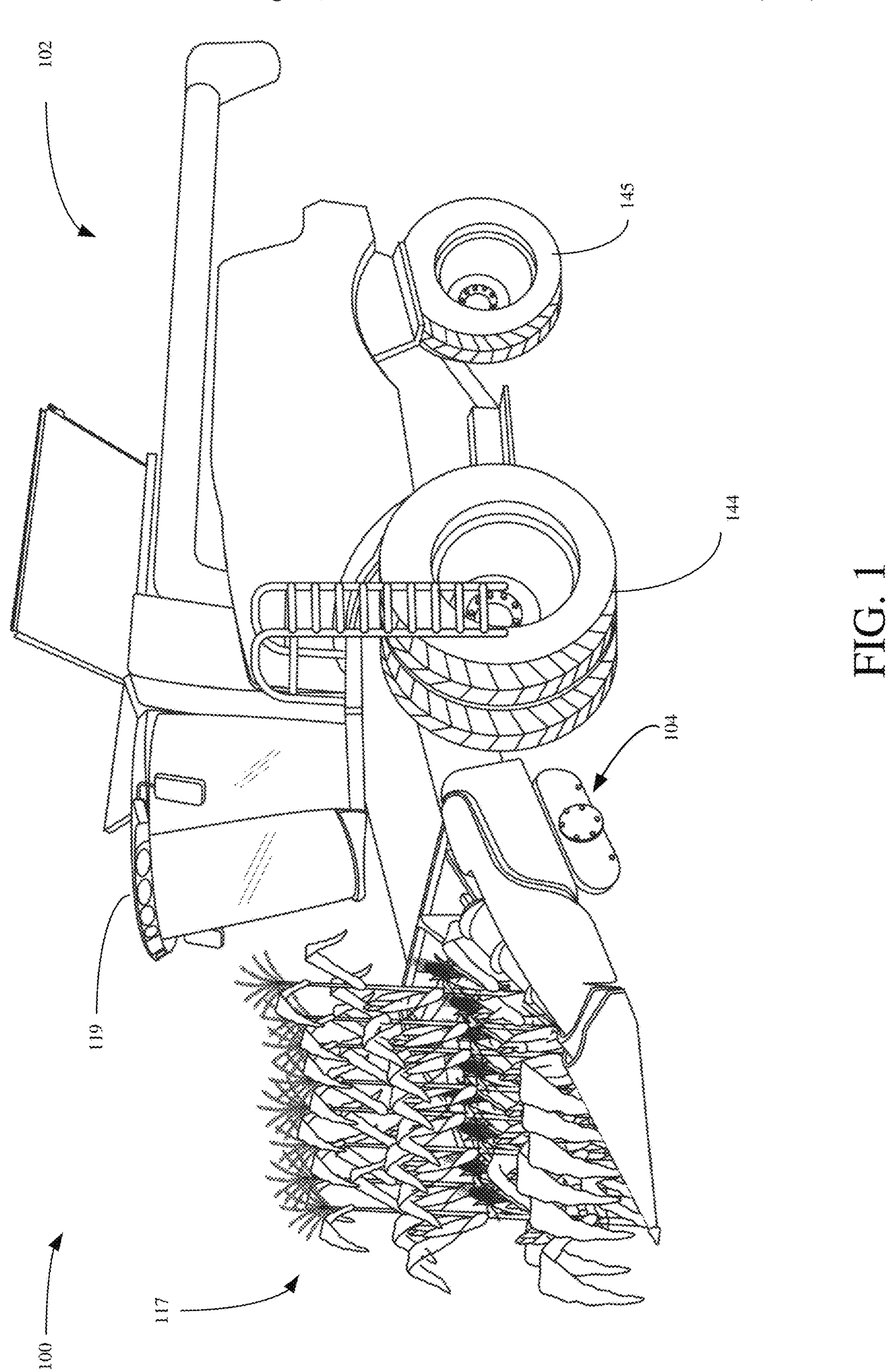
FIG. 1 illustrates one example of a mobile agricultural harvesting machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

A mobile agricultural harvesting machine, such as combine harvester, can include a non-header portion and a header portion or header, such as a corn header, coupled to the non-header portion. The corn header includes a plurality of row units spaced apart along the width of the corn header. Each row unit can include, among other things, a set of deck plates (also known as stripper plates), a set of crop gathering components, such as a set of gathering chains, as well a set of rollers (sometimes called stalk rollers). A row unit acts to gather corn plants towards the header, to sever the stalks, and to separate the corn cars from the corn plants. The gathering components gather the corn plant towards the header. The rollers, placed below the deck plates, pull the stalk down. The deck plates are controllably spaced apart, usually in a tapered fashion (narrower towards the front of the header and progressively wider moving rearward rearward) and define a gap that should be wide enough to receive the crop stalk and allow material other than grain (MOG) through but narrow enough to prevent the corn car (or a portion of the corn car) from slipping through the gap. If the deck plates are not spaced apart enough, the crop may not be harvested, the gathering components and rollers may be overburdened due to the resistance caused by the deck plates, or too much MOG may be taken in. Excess MOG can burden processing components of the non-header portion, result in less clean grain, grain loss, as well as other detrimental effects. On the other hand, if the deck plates are spaced too far apart, the corn cars may slip between the deck plates and contact the rollers which can result in grain loss at the header (sometimes referred to as butt shelling). Additionally, the header speed (also referred to as back shaft speed), or the speed of components of the header (such as the speed of the gathering chains or the speed of the stalk rollers, or both) can have an impact on the amount of MOG intake. For example, where header speed is too high, stalks may prematurely snap which may lead to grain loss at the header as well as additional intake of MOG. However, if header speed is set too low, crop may not be successfully captured by the header and thus result in grain loss at the header. Additionally, the header position (e.g., header height, header tilt, header roll, etc.) can have an impact on the amount of MOG intake. For example, as the height at which the header engages the crop increases, the less MOG that will be processed and therefore potentially taken in by the harvester. In another example, adjusting the fore-to-aft tilt of the header can also have an impact on MOG intake. For instance, tilting the header further aft allows the row units to process more of the stalk which may result in less MOG intake.

Some current systems include sensors on the header or sensors that observe the header, or both, that detect performance of the header in gathering the crop. Such sensors may be utilized in controlling various parameters of the header during the operation. However, a non-header portion may be attached to various headers, including various types of headers. Thus, sensors disposed on a particular header will only be usable during operation of that specific header. Additionally, sensors disposed on the non-header portion but configured to observe the header may not be as useful during the operation of other headers or other types of headers. Further, sensors disposed to observe the header may be more error prone due to the chaotic movement and amount of material on the header. That is, it may be more difficult to accurately determine a characteristic, such as MOG intake, when observing the header, as compared to observing in other areas such as on the non-header portion or behind the non-header portion.

Accordingly, systems and methods described herein provide for control of the deck plates of the mobile agricultural harvesting machine based on sensor feedback from sensors disposed on the non-header portion and configured to detect characteristics on or within the non-header portion or behind the non-header portion, where the sensor feedback can be indicative of various characteristics such as MOG intake. Sensors on the non-header portion, as compared to sensors on the header or sensors configured to detect the header, may be better protected from environmental conditions (weather, obscurants, etc.), that may affect sensor reliability and sensor accuracy, better protected from other conditions at the worksite that may affect sensor reliability and sensor accuracy (e.g., contact with objects at the worksite, vibration, etc.), and can be better utilized in subsequent operations of the non-header portion where the non-header portion is coupled to a different header. Additionally, utilization of sensors on the non-header portion, as compared to sensors on the header or sensor(s) configured to detect the header, may result in less overall sensors on the harvester which reduces the complexity of the system.

FIG. 1 is a perspective view that illustrates a mobile agricultural harvesting machine (or harvester) 100. Harvester 100 includes a self-propelled non-header portion 102 and a header portion (or header) 104, coupled to the non-header portion 102. Header 104 is illustratively a corn header and engages and processes corn plants 117 at a field as the harvester 100 travels over the field. Header 104 will be shown in more detail below.

Non-header portion 102 further includes a set of ground engaging traction elements, such as front wheels 144 and rear wheels 145. In other examples, one or both of the front wheels 144 and rear wheels 145 can comprise other types of ground engaging traction elements, such as tracks. In some examples, one of the front wheels 144 and rear wheels 145 are used to steer while the other are driven by a propulsion subsystem to propel the non-header portion 102 across a field at which the harvester 100 operates. In the example illustrated, harvester 100 includes an operator compartment or cab 119, which can include a variety of different operator interface mechanisms (e.g., 318 shown in FIG. 4) for controlling harvester 100 as well as for displaying various information.

Figure 2:
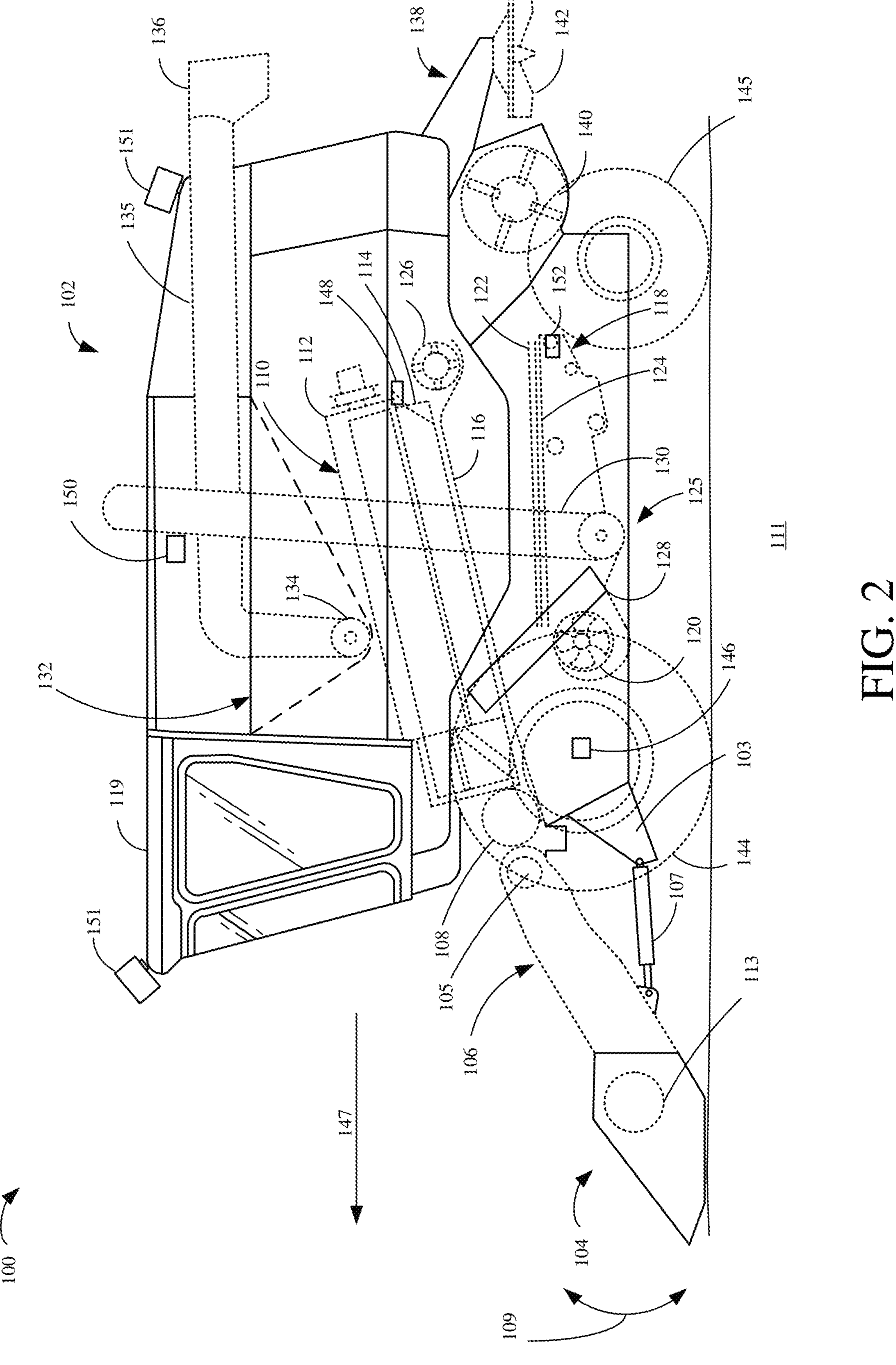
FIG. 2 is a partial pictorial, partial schematic illustration of one example of a mobile agricultural harvesting machine.

FIG. 2 is a partial pictorial, partial schematic, illustration of agricultural harvester 100. Harvester includes a non-header portion 102 and a header portion (or header) 104, coupled to the non-header portion 102. Harvester 100 includes a feeder house 106, a feed accelerator 108, and a thresher generally indicated at 110. The feeder house 106 and the feed accelerator 108 form part of a material handling subsystem 125. Header 104 is pivotally coupled to a frame 103 of non-header portion 102 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100 may also include one or more actuators that operate to apply a tilt angle, a roll angle, or both to the header 104 or portions of header 104.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into clean grain tank 132.

Harvester 100 also includes a material transfer subsystem that includes a conveying mechanism 134, a chute 135, and a spout 136. Conveying mechanism 134 can be a variety of different types of conveying mechanisms, such as an auger or blower. Conveying mechanism 134 is in communication with clean grain tank 132 and is driven (e.g., hydraulicly or electrically) to convey material from grain tank 132 through chute 135 and spout 136. Chute 135 is rotatable through a range of positions (shown in the storage position in FIG. 2) away from agricultural harvester 100 to align spout 136 relative to a material receptacle (e.g., grain cart, towed trailer, etc.) that is configured to receive the material. Spout 136, in some examples, is also rotatable to adjust the direction of the crop stream exiting spout 136.

Harvester 100 also includes a residue subsystem 138 that can include chopper 140 and spreader 142. Harvester 100 also includes a propulsion subsystem that includes an engine that drives ground engaging traction components, such as 144 or 144 and 145 to propel the harvester 100 across a worksite such as a field (e.g., ground 111). In some examples, a harvester within the scope of the present disclosure may have more than one of any of the subsystems mentioned above. In some examples, harvester 100 may have left and right cleaning subsystems, separators, etc., which are not shown in FIG. 2.

In operation, and by way of overview, harvester 100 illustratively moves through a field in the direction indicated by arrow 147. As harvester 100 moves, header 104 (and the associated row units) engage the corn plants to be harvested and separates the corn cars from the corn plants.

The separated crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 100 can include a variety of sensors, some of which are illustrated in FIG. 2, such as ground speed sensor 146, one or more separator loss sensors 148, a clean grain camera 150, one or more loss sensors 152 provided in the cleaning subsystem 118, and an observation sensor systems 151, which may include, one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation. Ground speed sensor 146 senses the travel speed of harvester 100 over the ground.

Ground speed sensor 146 may sense the travel speed of the harvester 100 by sensing the speed of rotation of the ground engaging traction components (such as wheels or tracks), a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100 is on a slope, the orientation of harvester 100 relative to the slope is known. For example, an orientation of harvester 100 could include ascending, descending or transversely travelling the slope.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 2. The separator loss sensors 148 may be associated with the left and right separators and may provide separate grain loss signals or a combined or aggregate signal. In some instances, sensing grain loss in the separators may also be performed using a wide variety of different types of sensors as well.

Clean grain camera 150 illustratively observes the grain that is being conveyed into or has been conveyed into clean grain tank 132. Clean grain camera 150 may detect various characteristics, such as the cleanliness of the grain within or being conveyed to clean grain tank 132. For example, clean grain camera 150 may detect an amount of MOG comingled with the grain within or being provide to clean grain tank 132.

Observation sensor systems 151 are disposed to observe various characteristics at the worksite. For example, observation sensor systems 151 may detect characteristics around harvester 100 as well as characteristics on harvester 100 (e.g., characteristics on header 104). For example, one observation sensor system 151 may be disposed to detect characteristics occurring at or on header 104, such as grain loss, MOG intake, stalk diameter, car size, as well as various other characteristics. Another observation sensor system 151 may be disposed to view rearwardly of the harvester 100 to detect various characteristics such as the amount of residue as well as grain loss (an amount of grain being output with the residue). These are merely some examples. Observation sensor systems 151 may comprise or may include one or a combination of camera(s) (e.g., mono or stereo camera(s), etc.), Lidar, Radar, Ultrasonic sensors, as well as various other sensors that are configured to emit and/or receive electromagnetic radiation.

Harvester 100 can include various other sensors, some of which will be discussed below.

Figure 3:
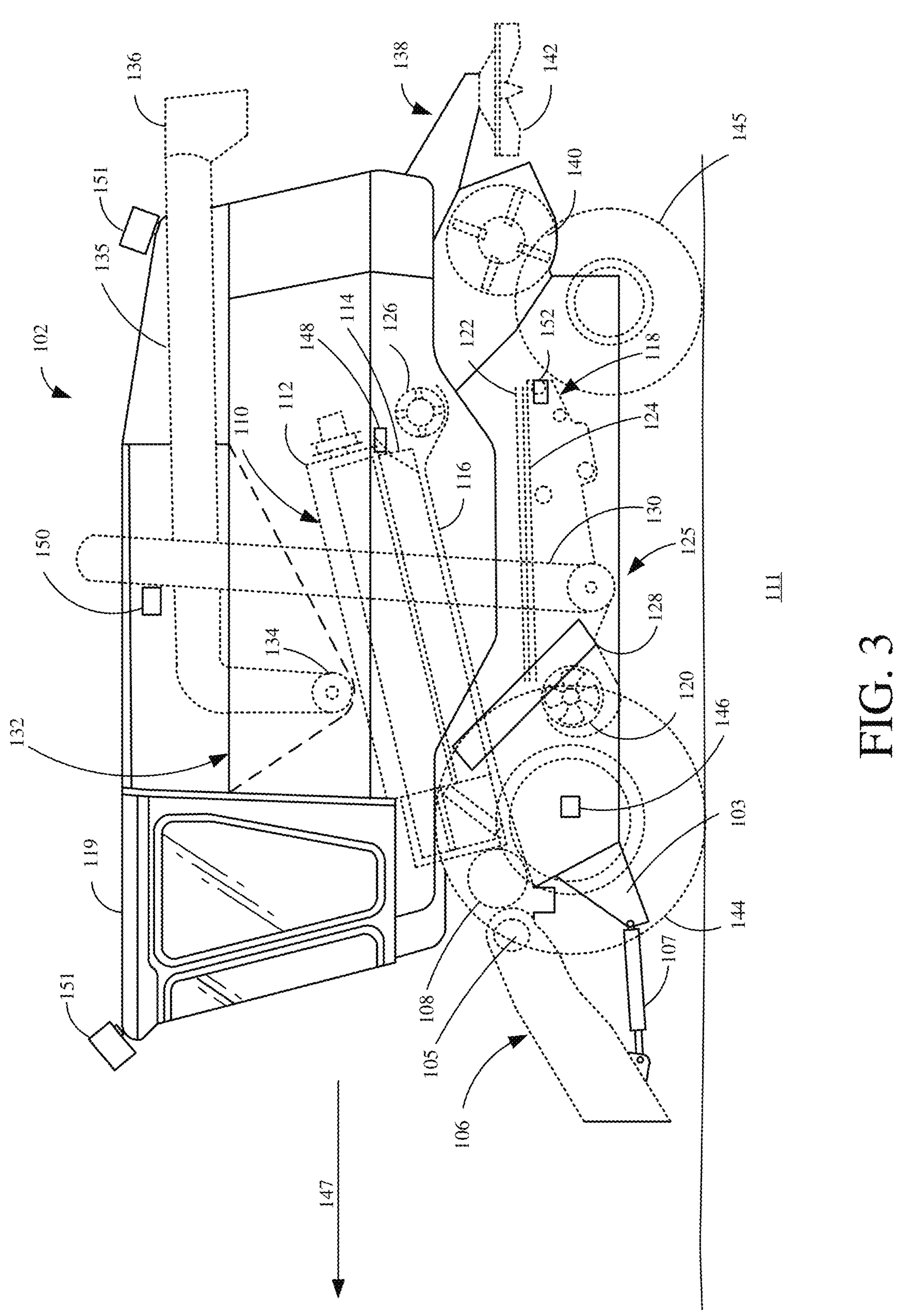
FIG. 3 is a partial pictorial, partial schematic illustration of one example of a non-header portion of the mobile agricultural harvesting machine shown in FIG. 2.

FIG. 3 is a partial pictorial, partial schematic, illustration of non-header portion 102 of agricultural harvester 100. As illustrated in FIG. 3, the non-header portion 102 of agricultural harvester 100 includes various elements of agricultural harvester 100, which have been similarly numbered in FIG. 3, but does not include header portion (or header) 104.

Figure 4:
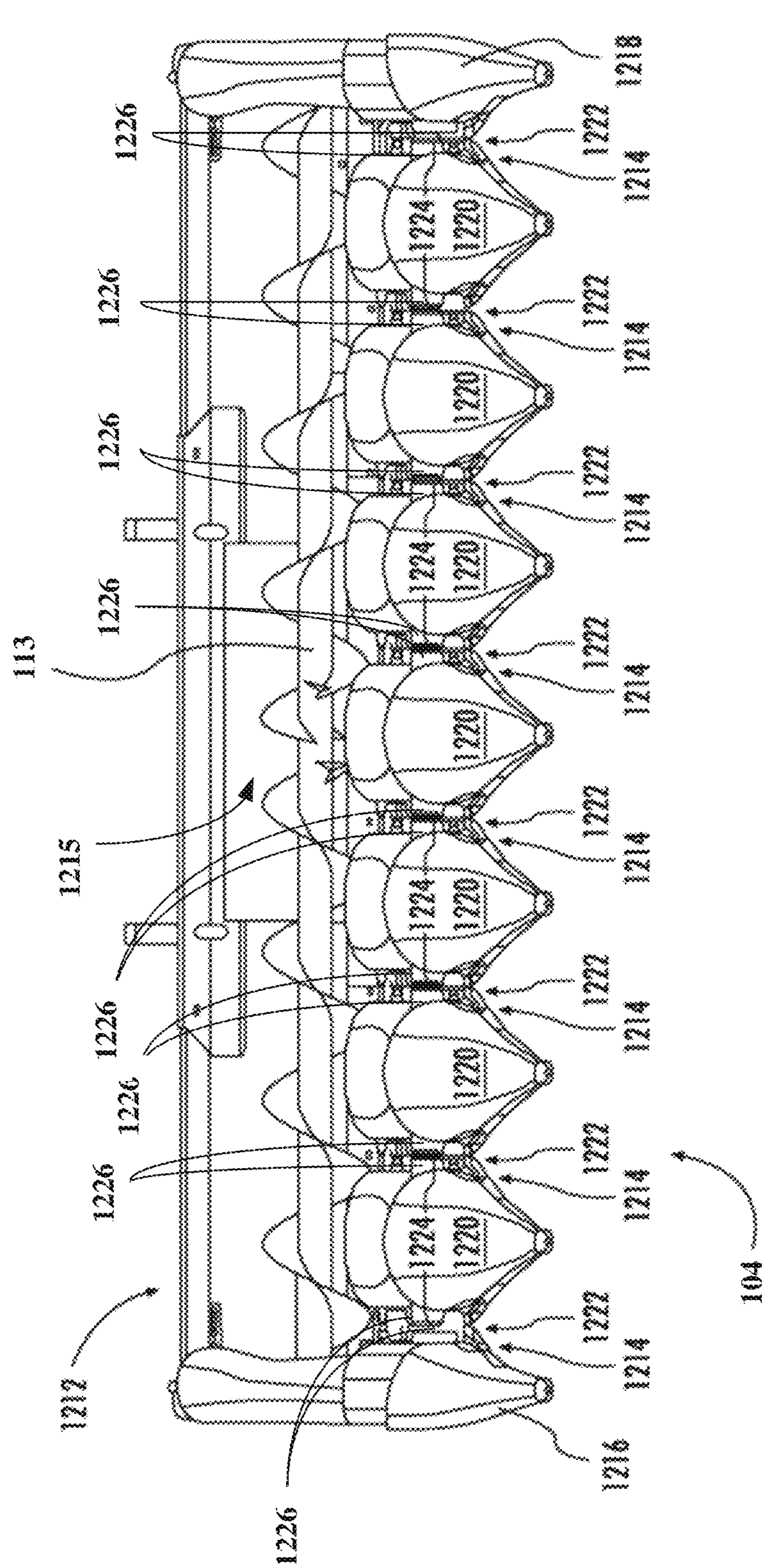
FIG. 4 illustrates one example of the header of the agricultural harvesting machine shown in previous FIGS. 1-2.

FIG. 4 is a front view of header 104. As illustrated in FIG. 4, header 104 includes a frame 1212, a cross-auger 113, an opening 1215, a first end divider 1216, a second end divider 1218, a plurality of central dividers 1220, a plurality of row units 1214, a plurality of crop receiving passages 1222, a plurality of deck plates 1226, and a plurality of gaps (or throats) 1224. Each row unit 1214 includes either two central dividers 1220 or a central divider 1220 and an end divider (one of 1216 or 1218). Each row unit 1214 is configured to process corn plants from a respective plant row. As the corn plants are received by the row units 1214 and proceed through respective crop receiving passages 1222, the stalks of the corn plants are severed and the corn cars are separated from the corn plants. The severed corn ears are conveyed to cross auger 113 which rotates to convey the corn ears to opening 1215 which, when header 104 is coupled to non-header 6 portion 102, is in communication with feeder house 106. The feeder house 106 can include further crop conveyance components (such as a belt or elevator) which deliver the corn ears further into the harvester 100 for further processing. Each operative pair of deck plates 1226 are spaced apart to define a respective gap 1224 which form a portion of a respective crop receiving passage 1222. While not shown in FIG. 4, it will be understood that each row unit 1214 further includes a set of crop gathering components (such as a set of gathering chains) and a set of rollers.

Figure 5:
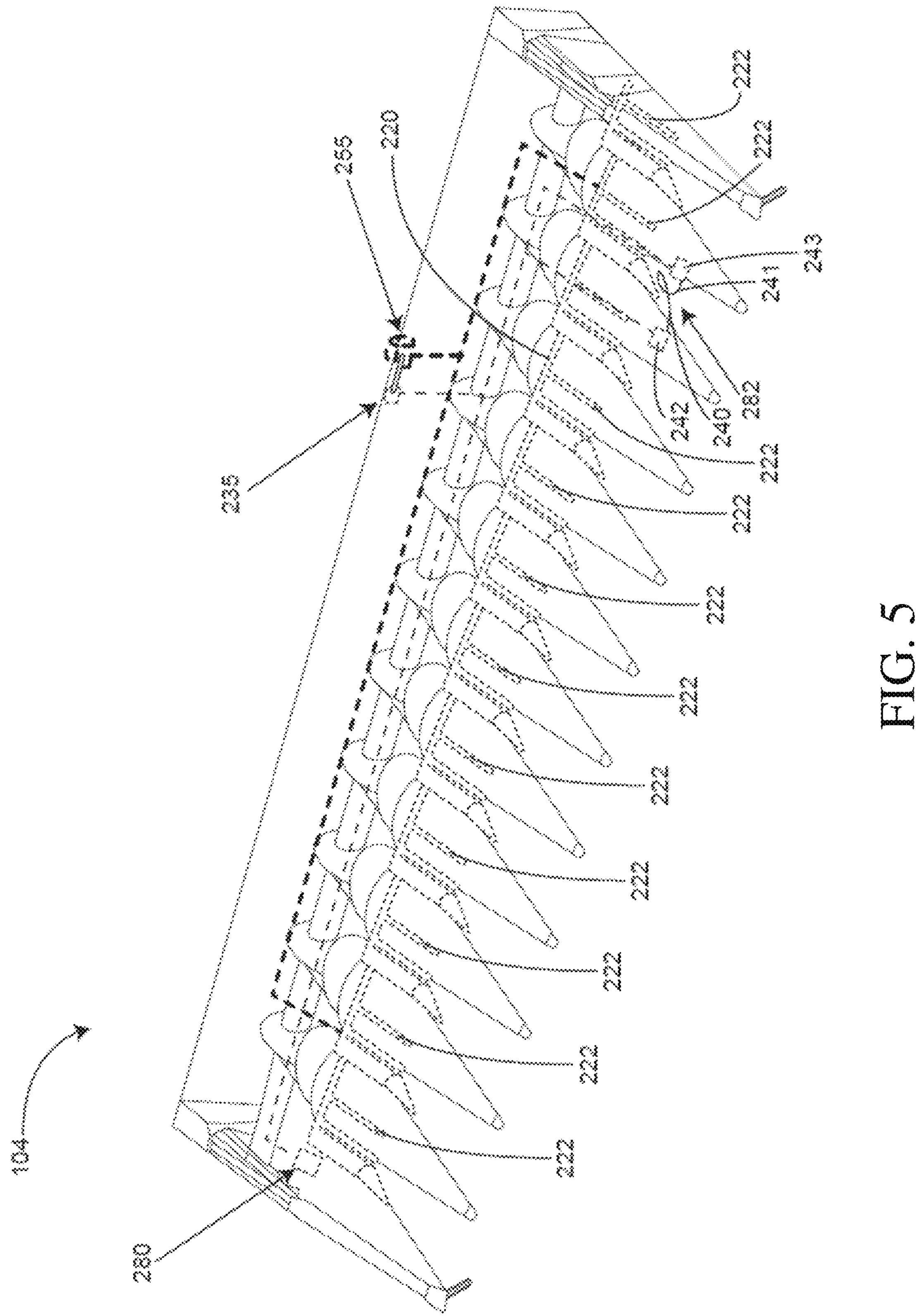
FIG. 5 is a partial pictorial, partial schematic illustration of one example of the header shown in FIG. 3.

FIG. 5 is a partial pictorial, partial schematic illustration showing one example of header 104. As shown in FIG. 5, header 104 includes a deck plate position sensor 280, a stalk diameter sensor 282, a deck plate controller 235, and a deck plate actuator 255. The stalk diameter sensor 282 is illustratively shown as a contact sensor, with one component (a first deflectable finger 240 and a first sensing device 242) disposed on a first side of the row unit and a second component (a second deflectable finger 241 and a second sensing device 243) disposed on a second side of the row unit. The deflectable fingers 240 and 241 contact the crop stalk and are displaced. The angular displacement of the first deflectable finger 240 is detected by the first sensing device 242 and the angular displacement of the second deflectable finger 241 is detected by the second sensing device 243. An electrical signal is generated based on the displacement. The electrical signal is indicative of the diameter of the crop stalk and is provided to the controller 235. In other examples, a digital output representative of the electrical signal can be generated, such as by an analog-to-digital converter, and can be provided to the controller 235, such as in the case of wireless communication between the stalk diameter sensor 282 and the controller 235. In one example, the first sensing device 242 and second sensing device 244 can comprise rotary encoders. In other examples, the sensing devices 242 and 244 can be other types of sensing devices.

Deck plate controller 235 is operable to generate control signals to control a deck plate subsystem to adjust the position of the deck plates. The deck plate subsystem includes a deck plate actuator 255, linkage 220, a plurality of sub-linkages 222, as well as a plurality of actuatable deck plates (1226 shown in FIG. 4). In the illustrated example, deck plate actuator 255 is a hydraulic actuator (though in other examples could be other types of actuators) that causes movement of linkage 220. Linkage 220 spans a width of header 104 (e.g., spans at least the width of the row units 1214). For each row unit, a sub-linkage 222 is coupled, at one end, to the linkage 220 and at another end to a deck plate. Movement of the linkage 220 causes movement of the sub-linkages 222 and corresponding movement of the deck plates. In the illustrated example, for each set of deck plates, one deck plate is fixed and while the other deck plate, coupled to the sub-linkage 222, is movable to change its position and thus spacing between the deck plates.

In generating the control signal to control the deck plate subsystem, controller 235 can also account for a current position of the deck plates, as detected by deck plate position sensor 280. Deck plate position sensor 280 illustratively detects a position (or spacing) of the deck plates and provides a sensor signal indicative of the detected position (or spacing) to the controller 235. After the position is adjusted, deck plate position sensor 280 can detect the adjusted position of the deck plates for compliance with the position commanded by the controller 235. In the illustrated example, deck plate position sensor 280 is a rotary encoder that detects motion of linkage 220.

While FIG. 5 illustrates that header 104 includes only a single stalk diameter sensor 282, in other examples, header 104 may include two or more stalk diameter sensors 282 each corresponding to a different row unit. Further, header 104 can include two or more deck plate position sensors 280, each corresponding to a different row unit (i.e., a different set of deck plates). Additionally, while only one deck plate controller 235 is shown, header 104 can include a plurality of deck plate controllers 235, such as a deck plate controller 235 for each set of a deck plates, or a plurality of deck plate controllers 235, each deck plate controller 235 of the plurality of deck plate controllers 235 responsible for a respective plurality of individual sets of deck plates. Various arrangements of the header 104 and deck plate control are contemplated herein, including simultaneous positioning of all deck plates (as illustrated), separate positioning for subsets of the sets of deck plates (e.g., sectional control, wherein each section includes a corresponding plurality of sets of deck plates), as well as separate and individual control of the position each set of deck plates. Depending on the control arrangement, the number of sensors 280, actuators 255, and controllers 235 may vary.

Figure 6:
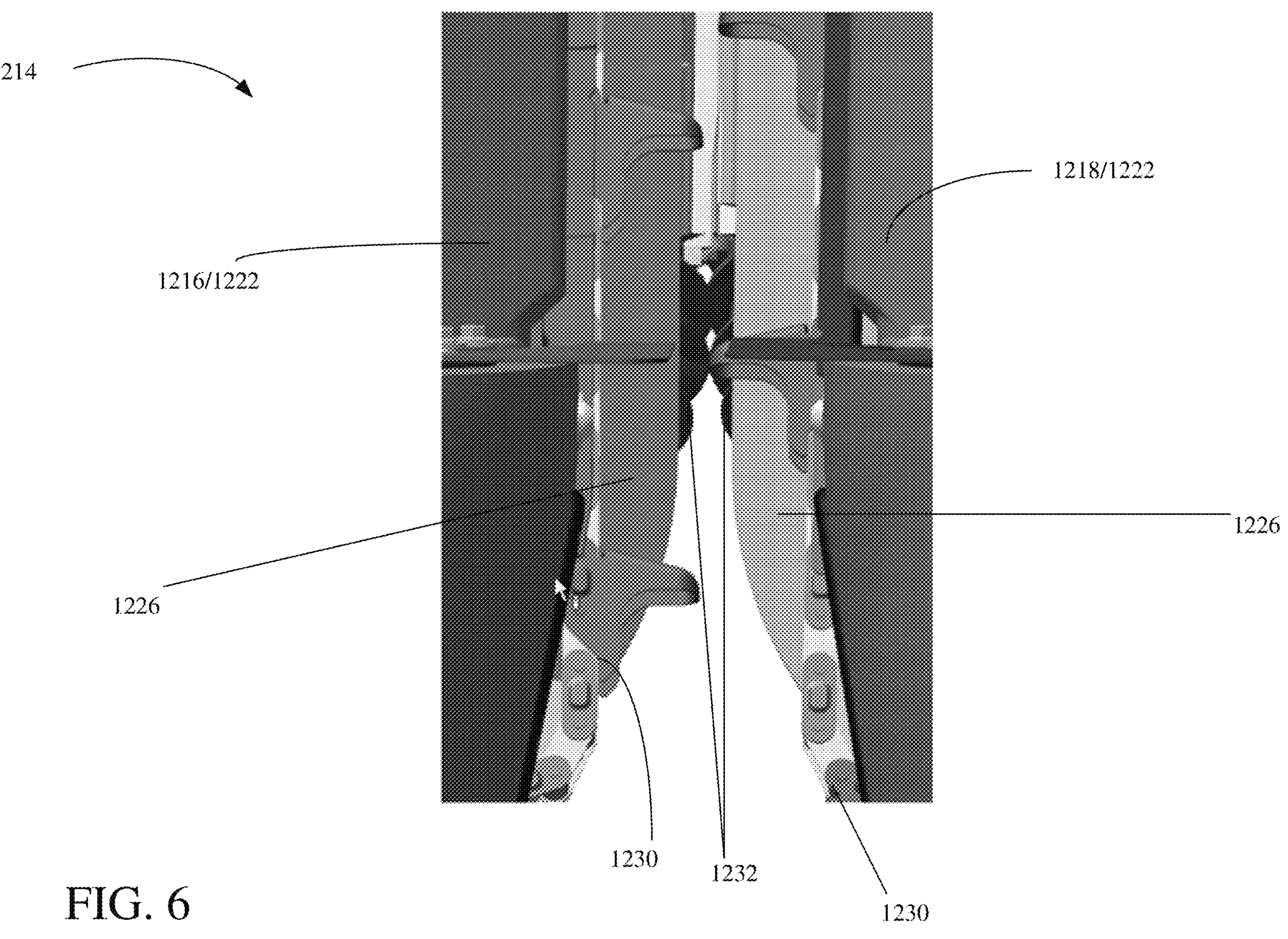
FIG. 6 illustrated one example of a row unit of the header shown in previous FIGS. 4-5.

FIG. 6 illustrates one example of a row unit 1214 of header 104. As illustrated in FIG. 6, row unit 1214 includes a pair of deck plates 1226, a pair of gathering chains 1230, and a pair of stalk rollers 1232. Also, as illustrated in FIG. 6, it can be seen that each row unit 1214 can include either two central dividers 1222 or a central divider 1222 and an end fender 1216 or 1218.

Figure 7:
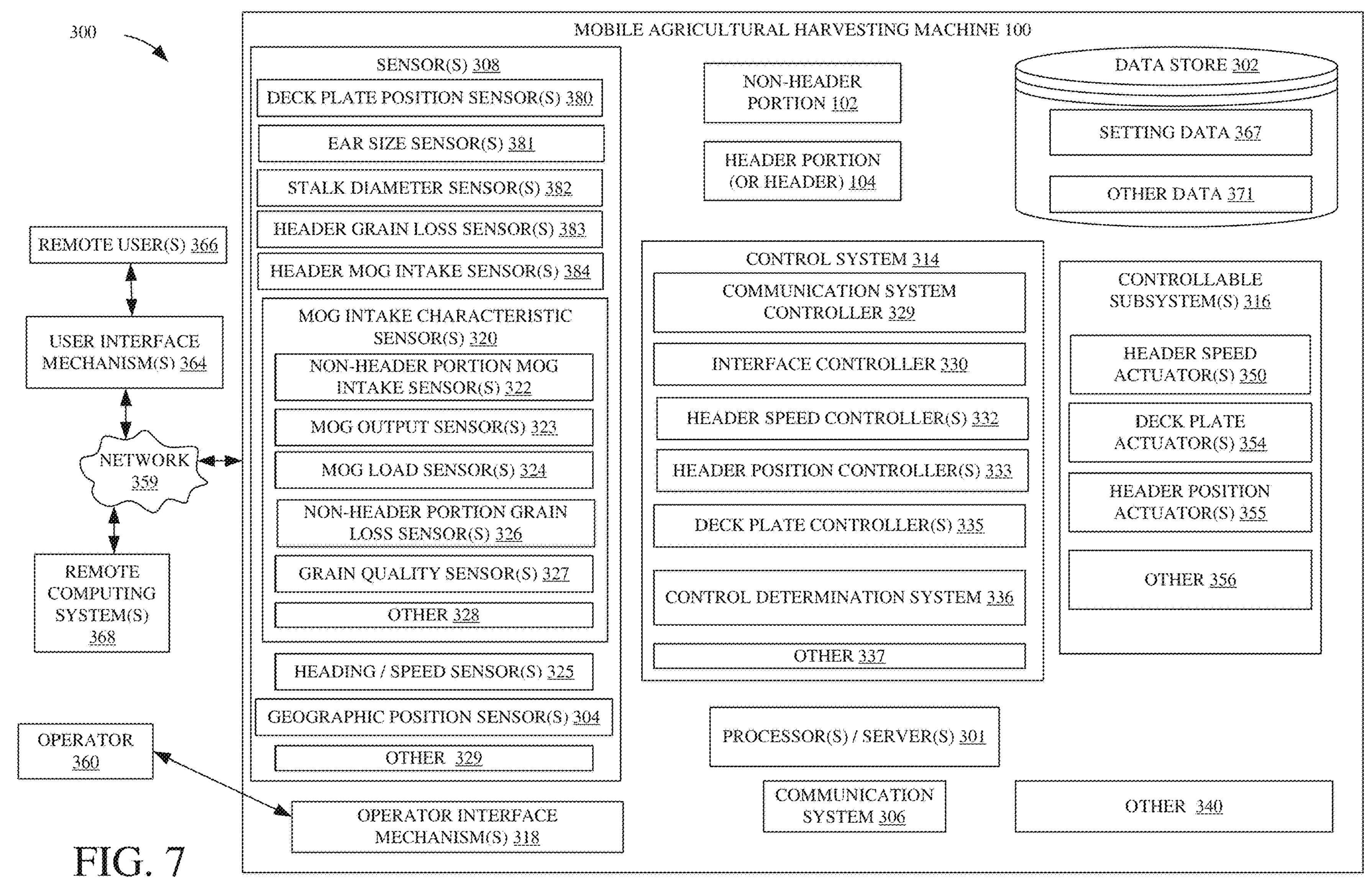
FIG. 7 is a block diagram showing some portions of an agricultural corn harvesting system, including a mobile agricultural harvesting machine, in more detail, according to some examples of the present disclosure.

FIG. 7 is a block diagram showing some portions of an agricultural corn harvesting system architecture 300 (herein also referred to as "agricultural system" or "agricultural corn harvesting system"). FIG. 7 shows that agricultural system 300 includes mobile agricultural harvesting machine 100 (also referred to herein as harvester 100 or mobile machine 100), one or more remote computing systems 368, and one or more remote user interfaces 364. Harvester 100, itself, illustratively includes non-header portion 102, header 104, one or more processors or servers 301, data store 302, communication system 306, and one or more sensors 308 that sense one or more characteristics at a worksite. Harvester 100 also includes control system 314, one or more controllable subsystems 316, and operator interface mechanisms 318. Harvester 100 can also include a wide variety of other items and functionality 340, some of which is described elsewhere herein.

As illustrated, data store 302 can include setting data 367 as well as various other data 371, some of which will be described below. Other data 371 can include, for example, computer executable instructions, executable by the one or more processors or servers 302, that, when executed by the one or more processors or servers 302, configure the one or more processors or servers 302 to implement or provide various other components or functionalities of harvester 100 described herein.

Sensors 308 sense characteristics at a worksite during the course of an operation. Sensors 308 illustratively include one or more deck plate position sensors 380, one or more car size sensors 381, one or more stalk diameter sensors 382, one or more header grain loss sensors 383, one or more header MOG intake sensors 384, one or more MOG intake characteristic sensors 320, one or more heading/speed sensors 325, one or more geographic position sensors 304, and can include various other sensors 329. MOG intake characteristic sensors 320, themselves, include one or more non-header portion MOG intake sensors 322, one or more MOG output sensors 323, one or more MOG load sensors 324, one or more non-header portion grain loss sensors 326, one or more grain quality sensors 327, and can include various other sensors 328 as well. At least some of sensors 308 are disposed on non-header portion 102 rather than header 104.

For example, MOG intake characteristic sensors 320 are disposed on non-header portion 102.

Deck plate position sensors 380 sense the position (or spacing) of one or more sets of deck plates 1226 of header 104 and generate sensor data (e.g., sensor signals, etc.) indicative of the detected position (or spacing) of the one or more sets of deck plates 1226. Deck plate position sensors 380 can be similar to deck plate position sensor 280 shown in FIG. 5 or can comprise various other types of deck plate position sensors.

Ear size sensors 381 sense the size of corn cars. Ear size sensor 381 can comprise various types of sensors, such as an observation sensor system configured to detect the size of cars on crop plants at the field or gathered by header 104. An observation sensor system can include one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

Stalk diameter sensors 382 sense the diameter of crop plants received by one or more row units 1214 of header 104 and generate sensor data (e.g., sensor signals, etc.) indicative of the detected stalk diameters of the crop plants received by one or more row units 1214. Stalk diameter sensors 382 can be similar to stalk diameter sensor 282 shown in FIG. 5 or can comprise various other types of stalk diameter sensors, such as an observation sensor system configured to detect the diameters of stalks engaged by header 104. An observation sensor system can include one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

Header grain loss sensors 383 sense an amount of grain loss occurring at the header 104. Header grain loss sensors 383 can include, for example, an observation system configured to detect the amount of grain loss occurring at the header, such as by detecting grain loss due to butt shelling, grain loss due to cars falling from header 104, or grain loss due to cars not being taken in by header 104. An observation sensor system can include one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

Header MOG intake sensors 384 detect MOG intake at the header 104. The header MOG intake sensors 384 are positioned on the header 104 or are otherwise disposed to observe the header 104. Header MOG intake sensors 384 can include, for example, an observation sensor system configured to detect MOG intake at the header. An observation sensor system can include one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

Geographic position sensors 304 illustratively sense or detect the geographic position or location of harvester 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. In some examples, the geographic position or location detected by geographic position sensors 304 can be processed to derive a geographic position or location of a given component of harvester 100. The dimensions of the mobile machine, such as the distance of certain components from the geographic position sensors 304, which can be stored in data store 302 (e.g., part of other data 371) or otherwise provided, can be used, in combination with detected geographic position or location, to derive the geographic position or location of the component. This processing can be implemented by processors or servers 302.

Heading/speed sensors 325 detect a heading and speed at which harvester 100 is traversing the worksite during the operation. This can include sensors that sense the movement of ground engaging traction elements (e.g., 144 or 145, or both) or can utilize signals received from other sources, such as geographic position sensor 304. Thus, while heading/speed sensors 325 as described herein are shown as separate from geographic position sensor 304, in some examples, machine heading/speed is derived from signals received from geographic positions sensors 304 and subsequent processing. In other examples, heading/speed sensors 325 are separate sensors and do not utilize signals received from other sources.

MOG intake characteristic sensors 320 are disposed on non-header portion 102 (as opposed to header 104) and are configured to detect characteristics occurring or existing on or within non-header portion 102 or occurring behind (relative to the direction of travel) non-header portion 102, or both.

Non-header portion MOG intake sensors 322 detect an amount of MOG taken in by non-header portion 102. Non-header portion MOG intake sensors 322 can include an imaging system (e.g., mono or stereo camera) disposed to view an interior of non-header portion 102 and detect an amount of MOG. Non-header portion MOG intake sensors 322 can include a sensor configured to detect an amount of force or energy (e.g., hydraulic pressure, kilowatt hour, pneumatic pressure, etc.) used to drive threshing rotor 112 at its set speed. The amount of force or energy needed to drive threshing rotor 112 at its set speed may be indicative of an amount of MOG taken in by the harvester 100, as more force or energy will generally be required to drive the threshing rotor 112 at the same speed where there is more MOG. These are merely some examples of non-header portion MOG intake sensors 322.

MOG output sensors 323 detect an amount of MOG output by harvester 100. MOG output sensors 323 can include an observation sensor system disposed to view residue exiting harvester 100. An observation sensor system can include one or more of one or more imaging 16 systems (e.g., mono or stereo cameras), optical sensors, lidar, radar, ultrasonic sensors, thermal or infrared sensors, as well as various other sensors, such as sensors that emit and/or received electromagnetic radiation. The amount of residue that exits harvester 100 is indicative of an amount of MOG taken in by harvester 100. MOG output sensors 323 can include sensors, such as electromagnetic radiation (EM) sensors configured to detect an amount of (EM) that passes through, is reflected by, or is absorbed by the residue output from harvester 100. These are merely some examples of MOG output sensors 323.

MOG load sensors 324 detect an amount of MOG on cleaning shoe (or cleaning subsystem). MOG load sensors 323 can include an imaging system (e.g., a camera, such as a mono or stereo camera, etc.) disposed to view cleaning shoe (or cleaning subsystem) and detect an amount of MOG within cleaning shoe (or cleaning subsystem). MOG load sensors 324 can include other types of sensors, such as EM sensors configured to detect an amount of (EM) that passes through, is reflected by, or is absorbed by the material within cleaning shoe (or cleaning subsystem). These are merely some examples of MOG load sensors 324.

Non-header portion grain loss sensors 326 detect an amount of non-header portion grain loss. Grain loss at various operating stages typically increases as the amount of MOG taken in by the harvester 100 increases, and thus, the amount of non-header portion grain loss occurring at various operating stages (e.g., during separation, during cleaning, residue processing and output, etc.) can indicate the amount of MOG taken in by harvester 100. Non-header portion grain loss sensors 326 can include various types of sensors, some of which have been previously described, such as loss sensors 152 or separator loss sensors 148, or both. Non-header portion grain loss sensors 326 can also include an observation sensor system configured to detect an amount of grain being output as residue. An observation sensor system can include one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation. These are merely some examples of non-header portion grain loss sensors 326.

Grain quality sensors 326 detect a quality of grain gathered in clean grain tank 132. As non-header portion MOG intake increases, more and more MOG will be intermingled with the grain within or provided to clean grain tank 132 and thus, the quality of the grain will decrease. Accordingly, grain quality can be indicative of an amount of MOG taken in by harvester 100. Grain quality sensors 326 can include an imaging system (e.g., mono or stereo camera) such as clean grain camera 150. This is merely one example of a grain quality sensor 326.

Other MOG intake characteristic sensors 328 can include various other types of sensors on non-header portion 102 that detect various other characteristics indicative of MOG intake.

As can be seen MOG intake characteristic sensors 320 can include a plurality of different sensors, each different sensor being configured to detect a respective and different characteristic (e.g., non-header portion MOG intake, MOG output, MOG load, non-header portion grain loss, grain quality, etc.) to and provide sensor data indicative of non-header portion MOG intake. The sensor data output by the one or more MOG intake characteristic sensors 320 can be processed, by control determination system 336, to derive non-header portion MOG intake characteristic values indicative of an amount of MOG taken in by the harvester 100. This will be described in more detail in FIG. 8.

Other in-situ sensors 327 may be any of a variety of other types of sensors.

FIG. 7 shows that an operator 360 may operate harvester 100. The operator 360 interacts with operator interface mechanisms 318. The operator 360 may be local to harvester 100 or may be remote from harvester 100. In some examples, operator interface mechanisms 318 may include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, operator 360 may interact with operator interface mechanisms 318 using touch gestures. These examples described above are provided as illustrative examples and are not intended to limit the scope of the present disclosure. Consequently, other types of operator interface mechanisms 318 may be used and are within the scope of the present disclosure.

FIG. 7 also shows one or more remote users 366 interacting with harvester 100 or remote computing systems 368, or both, through user interface mechanisms 364 over network 359. User interface mechanisms 364 can include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, a remote user 364 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, harvester 100 can be controlled remotely by remote computing systems 368 or by remote users 366, or both. As will be described below, in some examples, one or more of the components shown being disposed on harvester 100 in FIG. 7 can be located elsewhere, such as at remote computing systems 368 and/or user interface mechanisms 364.

FIG. 7 also shows that harvester 100 includes a control system 314 and one or more controllable subsystems 316. Control system 314 includes communication system controller 329, interface controller 330, one or more header speed controllers 332, one or more header position controllers 333, one or more deck plate controllers 335, control determination system 336, and can include other items 337. Controllable subsystems 316 include one or more header speed actuators 350, one or more deck plate actuators 354, one or more header actuators 355, and can include other items 356.

In some examples, communication system controller 329 controls communication system 306 to communicate sensor data (generated by sensors 308) to other mobile machines that are operating at the same worksite or in the same operation. In some examples, communication system controller 329 controls the communication system 306 to send the sensor data to other remote systems, such as remote computing systems 368 or remote user interfaces 364, or both.

Interface controller 330 is operable to generate control signals to control interface mechanisms, such as operator interface mechanisms 318 or user interface mechanisms 364, or both, to generate various outputs, such as displays, alerts, recommendations, or various other indications.

The interface controller 330 is also operatable to present the sensor data (generated by in-situ sensors 308), or other information derived from or based on the sensor data to operator 360 or a remote user 366, or both. As an example, interface controller 330 generates control signals to control a display mechanism to display the sensor data for the operator 360 or a remote user 366, or both. In another example, interface controller 330 generates control signals to control a display mechanism to display a control recommendation (e.g., recommended deck plate spacing, recommended header speed, etc.)

Header speed controllers 332 illustratively generate control signals to control header speed actuators 350 to control the operating speed of one or more components of header 104. In one example, header speed actuators 350 include the power take off (PTO) of the non-header portion 102 which couples to a shaft (e.g., back shaft) of the header 104. The PTO is rotatable at variable speeds and variably rotates the shaft of the header 104. The rotation of the shaft of the header 104 in turn (e.g., via shafts, gears, belts, chains, etc.) rotates one or more components of the header such as the gathering chains 1230 and stalk rollers 1232 of each row unit 1214, as well as, in some examples, other components of the header, such as cross auger 113. Accordingly, header speed controllers 332 can generate control signals to control the speed of the PTO (as the header speed actuator 350) to in turn control the speed of one or more components of the header 104, such as the gathering chains 1230, the stalk rollers 1232, the cross auger 113, or a combination thereof. In other examples, the components of the header 104 may have respective actuators (e.g., hydraulic, electric, pneumatic motors) which are controllable to control the speed of rotation of the respective components. Header speed controllers 332 illustratively generate control signals based on sensor data provided by sensors 308 (e.g., MOG intake characteristic data provided by MOG intake characteristic sensors 320, etc.) or based further on, as will be described in more detail below, outputs of control determination system 336.

Header position controllers 333 illustratively generate control signals to control header position actuators 355 (e.g., 107, etc.) to control the position (e.g., height, tilt, or roll) of header 104 based on one or more of the sensor data generated by sensors 308 (e.g., MOG intake characteristic data provided by MOG intake characteristic sensors 320, etc.) or based further on, as will be described in more detail below, outputs of control determination system 336.

Deck plate controllers 335 illustratively generate control signals to control deck plate actuators 354 to control the position (or spacing) of one or more deck plates of harvester 100 based on one or more of the sensor data generated by sensors 308 (e.g., MOG intake characteristic data provided by MOG intake characteristic sensors 320, etc.) or based further on, as will be described in more detail below, outputs of control determination system 336.

Deck plate controller(s) 335 can be similar to deck plate controller 235 shown in FIG. 5. In some examples, there may be more than one deck plate controller 335 that controls the position (or spacing) of a respective set of deck plates (e.g., a single pair of deck plates) or of a respective plurality of deck plates (e.g., a section comprising a plurality of pairs of deck plates). In some examples, there may be a single deck plate controller 335 that controls the position (or spacing) of a plurality of deck plates either individually, all together, or all together in subsets (e.g., there may be multiple sections each having a plurality of sets of deck plates, the deck plates of each section controlled together but separate from the other sections). Deck plate actuators 354 can be similar to the deck plate actuator shown in FIG. 5. For example, deck plate actuators 354 can include one or more deck plate actuators (e.g., similar to deck plate actuator 255). The deck plate actuators 354 can take various other forms.

Other items 337 can include other controllers included on the harvester 100, or at other locations in agricultural system 300, that can control other subsystems based on one or more of the sensor data generated by sensors 308. Other items 356 can include other subsystems of harvester 100, such as material handling subsystem (and components thereof), cleaning subsystem (and components thereof), material transfer subsystem (and components thereof), propulsion subsystem, a steering subsystem, as well as various other subsystems. It will be understood that the various controllers of control system 314 can be dispersed in various different ways such as on the non-header portion 102, on the header portion 104, or some may be on the non-header portion 102 while others are on the header portion 104.

While the illustrated example of FIG. 7 shows that various components of agricultural system 300 are located on harvester 100, it will be understood that in other examples one or more of the components illustrated on harvester 100 in FIG. 7 can be located at other locations, such as one or more remote computing systems 368 or remote user interface mechanisms 364. For instance, one or more of data stores 302 and control determination system 336 can be located remotely from harvester 100 but can communicate with harvester 100 via communication system 306 and network 359. Similarly, information generated by the harvester 100 (e.g., sensor data generated by sensors 308) may be provided to the remote locations over network 359.

In some examples, control system 314 (or one or more components thereof) can be located remotely from harvester 100 such as at one or more of remote computing systems 368 and remote user interface mechanisms 364. In other examples, a remote location, such as remote computing systems 368 or user interface mechanisms 364, or both, may include a respective control system which generates control values that can be communicated to harvester 100 and used by on-board control system 314 to control the operation of harvester 100. These are merely examples.

It will be noted that network 359 can comprise one or more of may be a cellular network, a wide area network, a local area network, a near field communication network, or any of a variety of other networks or combinations of networks.

Figure 8:
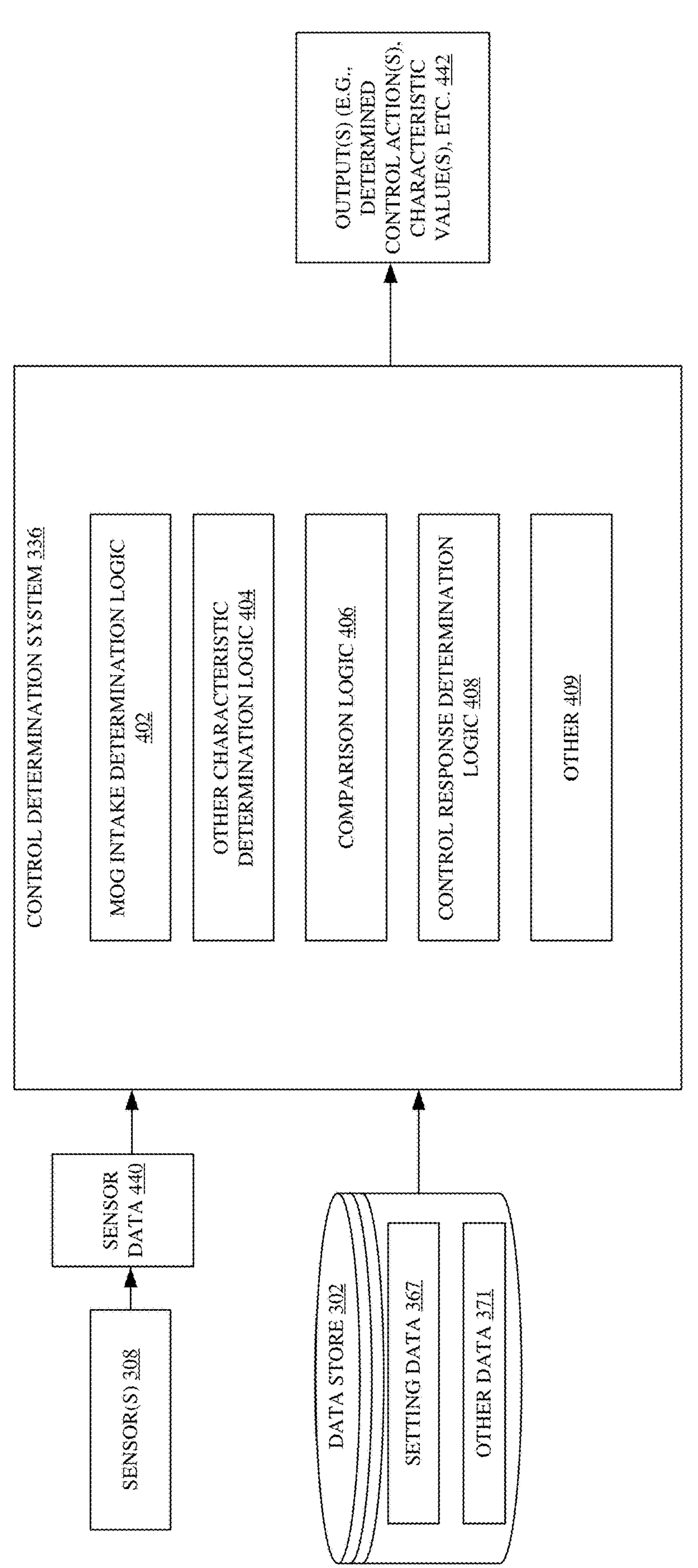
FIG. 8 is a block diagram showing one example of a control determination system.

FIG. 8 is a block diagram of a portion of the agricultural corn harvesting system architecture 300 shown in FIG. 7. Particularly, FIG. 8 shows, among other things, examples of the control determination system 336 in more detail. As illustrated in FIG. 8, control determination system 336 includes MOG intake determination logic 402, other characteristic determination logic 404, comparison logic 406, control response determination logic 408, and can include other items 409 as well.

Control determination system 336 determines levels (e.g., values) of various characteristics detected by sensors 308 based on sensor data 440 generated by sensor 308. Control determination system 336 further determines control actions to be taken based on the sensor data 440 (or based on the determined levels, or values, of various characteristics derived from the sensor data 440). Control determination system 336 thus generates one or more outputs 442 indicative of the determined levels (values) of various characteristics detected by sensors 308 or of determined control actions, or both. Sensor data 440 includes sensor signals, images, etc., generated by sensors 440 and indicative of various characteristics. As shown in FIG. 8, control determination system 336 also obtains various data from data store 302.

MOG intake determination logic 402 illustratively determines non-header portion MOG intake levels (values) based on sensor data output by MOG intake characteristic sensors 320. Additionally, MOG intake determination logic 402 can determine levels (values) of the characteristic detected by each of the MOG intake characteristic sensors 320. For example, MOG intake determination logic 402 can determine non-header portion MOG intake values based on sensor data output by non-header portion MOG intake sensors 322, MOG output values based on sensor data output by MOG output sensors 323, MOG load values based on sensor data output by MOG load sensors 324, non-header portion grain loss values based on sensor data output by non-header portion grain loss sensors 326, grain quality values based on sensor data output by grain quality sensors 327, as well as various other values based on sensor data output by other MOG intake characteristic sensors 328. In some examples, MOG intake determination logic 402 determines a non-header portion MOG intake value based on sensor data from a single of MOG intake characteristic sensor 320. In other example, MOG intake determination logic 402 determines a non-header portion MOG intake value based on sensor data from multiple MOG intake characteristic sensors 320. Where multiple MOG intake characteristic sensors are used, MOG intake determination logic 402 can aggregate the non-header portion MOG intake value indicated by each separate sensor data to generate the determined non-header portion MOG intake value. In some examples, aggregation can include averaging or weighted averaging. In some examples, aggregation can include additive combination (e.g., an amount of MOG in the clean grain may be added to an amount of MOG exiting the harvester 100 to determine a total amount of MOG taken in by the harvester 100).

Other characteristic determination logic 404 illustratively determines levels (values) of various other characteristics based on sensor data output by other sensors of sensors 308, such as deck plate spacing values based on data generated by deck plate spacing sensors 380, car size values based on sensor data output by car size sensors 381, stalk diameter values based on sensor data output by stalk diameter sensors 382, header grain loss values based on sensor data output by header grain loss sensors 383, header MOG intake values based on sensor data output by header MOG intake sensors 384, heading/speed values based on sensor data output by heading/speed sensors 325, geographic location values based on sensor data output by geographic position sensors 304, as well as various other values based on sensor data output by other sensors 329.

It will be appreciated that logic 402 or logic 404, or both, can utilize various sensor signal filtering functionalities, noise filtering functionalities, sensor signal categorization, aggregation, normalization, as well as various other processing functionalities. Similarly, logic 402 or logic 404, or both, can utilize various image processing techniques such as, sequential image comparison, RGB, edge detection, black/white analysis, machine learning, neural networks, pixel testing, pixel clustering, shape detection, as well any number of other suitable image processing and data extraction functionalities.

Comparison logic 406 illustratively compares the characteristic levels (values) determined by logic 402 or by logic 404, or both, to reference values, such as threshold values or historical values. Reference values may be stored as part of setting data 367 and obtained therefrom. For example, in some examples, control actions may be taken when a value of a characteristic meets a threshold value. For instance, there may be a MOG intake value threshold which, when met by the MOG intake value determined by MOG intake determination logic 402, causes control response determination logic 408 to determine, and provide as an output 442, control action(s) to be taken, such as one or a combination of an adjustment to the deck plate spacing, an adjustment to header speed, or an adjustment to header position. In another example, where the MOG intake value determined by MOG intake determination logic 402, does not meet the MOG intake value threshold, control response determination logic 408 can determine, and provide as an output 442, control action(s) to be taken, such as one or a combination of an adjustment to the deck plate spacing, an adjustment to header speed, or an adjustment to header position. In another example, the reference value may be a historical value of the characteristic, such as value(s) of the characteristic previously detected in the same operation. In this way, it can be determined how the characteristic value is trending. For example, where it is determined that non-header portion MOG intake is trending upwards (increasing) or trending downwards (decreasing), as indicated by the comparison of the non-header portion MOG intake value determined by MOG intake determination logic 402 to the reference non-header portion MOG intake value, control response determination logic can determine, and provide as an output 442, control action(s) to be taken, such as one or a combination of an adjustment to the deck plate spacing, an adjustment to header speed, or an adjustment to the header position.

Alternatively, or in addition to, utilization of comparison to a reference value, as described above, control response determination logic 408 can also consider characteristic values determined by other characteristic determination logic 404, for example, one or more of car size values, stalk diameter values, header grain loss values, header MOG intake values, or harvester speed values. For instance, a deck plate spacing adjustment may be limited (or further adjusted) by one or more of car size, stalk diameter, header grain loss, or header MOG intake. For instance, an initial adjustment to the deck plate spacing may be undertaken, and then a subsequent header MOG intake value may be used to fine tune that adjustment. In another example, a header speed adjustment may be limited (or further adjusted) by one or more of ear size, stalk diameter, header grain loss, harvester speed, or header MOG intake. For instance, an initial adjustment to the header speed may be undertaken, and then a subsequent header MOG intake value may be used to fine tune that adjustment. In another example, a header position adjustment may be limited (or further adjusted) by one or more of header grain loss, harvester speed, or header MOG intake. For instance, an initial adjustment to the header position may be undertaken, and then a subsequent header MOG intake value may be used to fine tune that adjustment. The interrelationships of these various characteristic values and resultant control may be stored as part of settings data 437, for example, as part of look-up table(s), model(s), machine learning output(s), expert knowledge, computer executable instructions, as well as various other data.

Controllers of control system 314 then generate control signals to control respective controllable subsystems 316 based on the control action(s) indicated in the output 442.

Figure 9:
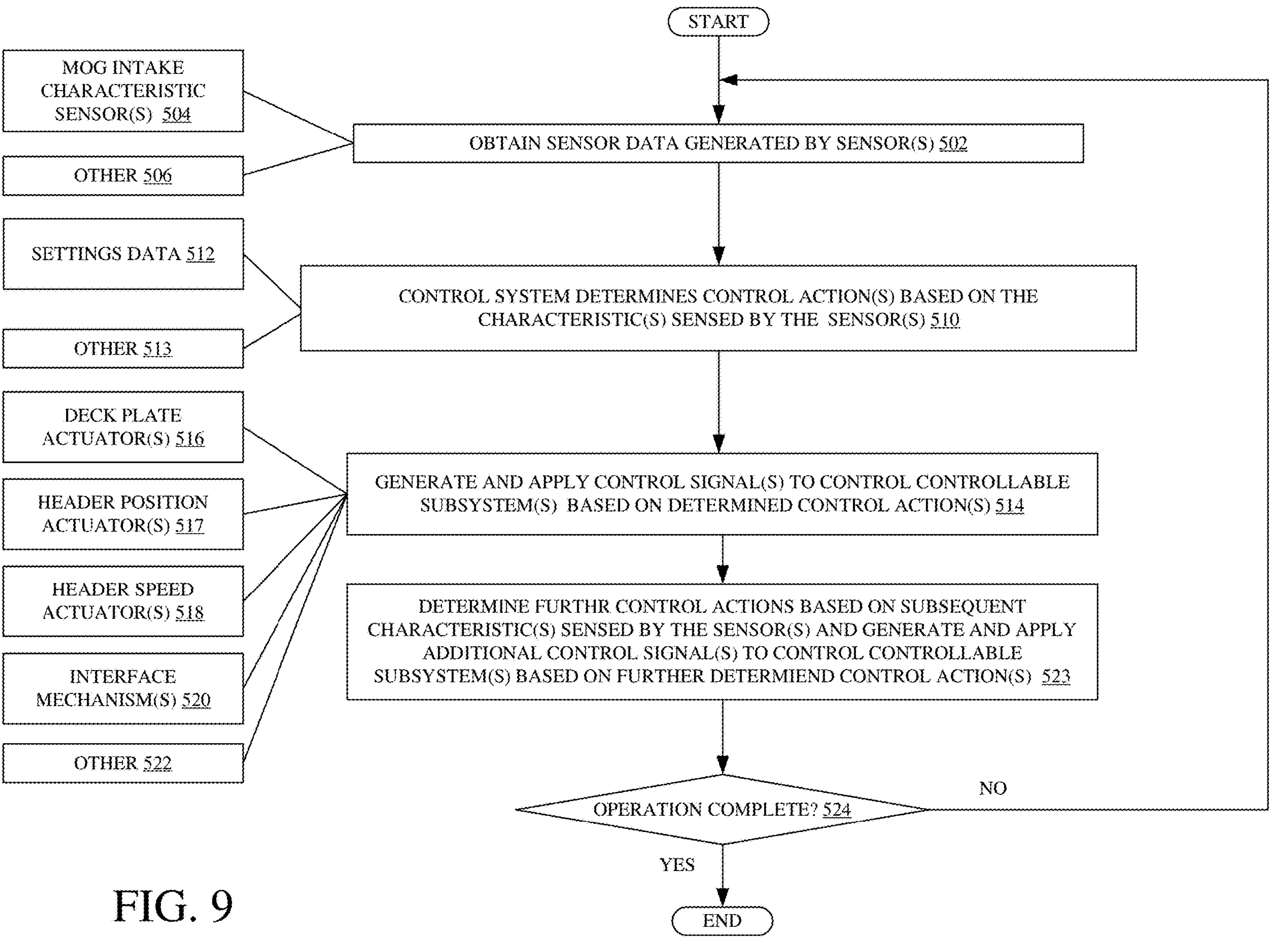
FIG. 9 is a flow diagram illustrating one example of operation of an agricultural corn harvesting system.

FIG. 9 shows a flow diagram illustrating one example of the operation of agricultural corn harvesting system architecture 300 in controlling harvester 100 based on sensor data generated by sensors 308.

At block 502, as harvester 100 is operating, sensors 308 generate sensor data indicative of value(s) of characteristic(s), for example, MOG intake characteristic sensors 320 generate sensor data indicative of one or more values of non-header portion MOG intake, as 6 indicated by block 504. In other examples, other sensors of sensors 308, generate sensor data indicative of one or more values of one or more other characteristics as indicated by block 506. At block 506, deck plate spacing sensors 380 can generate sensor data indicative of one or more values of current spacing of one or more pairs of deck plates. At block 506, car size sensors 381 can generate sensor data indicative of one or more values of car size. At block 506, stalk diameter sensors can generate sensor data indicative of one or more values of stalk diameter. At block 506, header grain loss sensors 383 can generate sensor data indicative of one or more values of header grain loss. At block 507, header MOG intake sensors 384 can generate sensor data indicative of one or more values of header MOG intake. At block 506, heading/speed sensors 325 can generate sensor data indicative of one or more values of harvester heading or harvester speed, or both. At block 506, geographic position sensors 304 can generate sensor data indicative of one or more values of harvester 100 geographic location. At block 506, one or more other sensors 329 can generate sensor data indicative of one or more values of one or more other characteristics.

At block 510 control system 314 determines one or more control actions based on the one or more characteristic values indicated by the sensor data generated by the sensors 308. For example, at block 510, control determination system 402 can determine values of one or more characteristics based on the sensor data 440 generated by sensors 308, such as determining one or more of non-header portion MOG intake values, deck plate position values, car size values, stalk diameter values, header grain loss values, header MOG intake values, heading/speed values, geographic locations values, or other characteristic values. At block 510, control determination system 402 can compare each of the one or more determined values to a respective reference value, such as a threshold value or a historical value. Based on the one or more determined values, and in some examples, the comparison to the reference value(s), control determination system 336 determines one or more control actions and provides the one or more determined control actions as an output. Some examples of determined control actions include, but are not limited to, adjusting the spacing of one or more pairs of deck plates, adjusting header speed (or adjusting the speed of one or more components of header 104), adjusting the position of header 104, generating a display, alert, recommendation, or other indication on an interface mechanism (e.g., 318 or 364, or both) to indicate a recommended control action that should be implemented by an operator 360 or will be implemented by the control system 314 or to display the one or more determined characteristic values, or both. In other examples, determined control actions can include control of various other controllable subsystems of harvester 100, such as material handling subsystem, material transfer subsystem, cleaning subsystem, propulsion subsystem, steering subsystem, as well as various other controllable subsystems.

At block 514 control system 314 generates control signal(s) to control one or more controllable subsystems 316 based on the determined control actions. For example, control system 314 can generate control signal(s) to control one or more deck plate actuators 354 to control a spacing of one or more pairs of deck plates, as indicated by block 516. Alternatively, or additionally control system 314 can generate control signal(s) to control one or more header position actuators 355 to control header position, as indicated by block 517. Alternatively, or additionally, control system 314 can generate control signal(s) to control one or more header speed actuators 350 to control a speed of one or more components of header, such as one or more gathering chains, one or more stalk rollers, or a cross auger, as indicated by block 518. Alternatively, or additionally, control system 314 can generate control signal(s) to control an interface mechanism (e.g., 318 or 364, or both) to generate a display, an alert, a recommended control action, or various other indications, as indicated by block 520. Additionally, or alternatively, control system can generate control signal(s) to control various other controllable subsystems, such as material handling subsystem, material transfer subsystem, cleaning subsystem, propulsion subsystem, steering subsystem, as well as various other controllable subsystems. These are merely some examples.

Processing proceeds to block 523 where the sensors 308 continue to generate sensor data, after the actions taken at block 514. At block 523, the control system determines further control actions based on the subsequent sensor data generated by sensors 308. And, at block 523, the control system 314 generates and applies further control signal(s) to control one or more controllable subsystems 316 based on the further determined control actions. For example, an initial adjustment to one or more controllable subsystems may be made at block 514. Subsequently, one or more characteristics may be detected by sensors 308 and be used to fine tune the initial adjustments. For instance, one or more of the deck plate spacing, the header speed, or the header position may be initially adjusted at block 514. After the initial adjustment(s), a characteristic, such as header MOG intake, may be detected and used to further adjust one or more of the deck plate spacing, the header speed, or the header position. This is merely one example.

Processing proceeds to block 524 where it is determined if the operation has been completed. If, at block 524, it is determined that the operation has not been completed, then processing returns to block 502. If, at block 524, it is determined that the operation has been completed, then the operation ends.

Figure 10A:
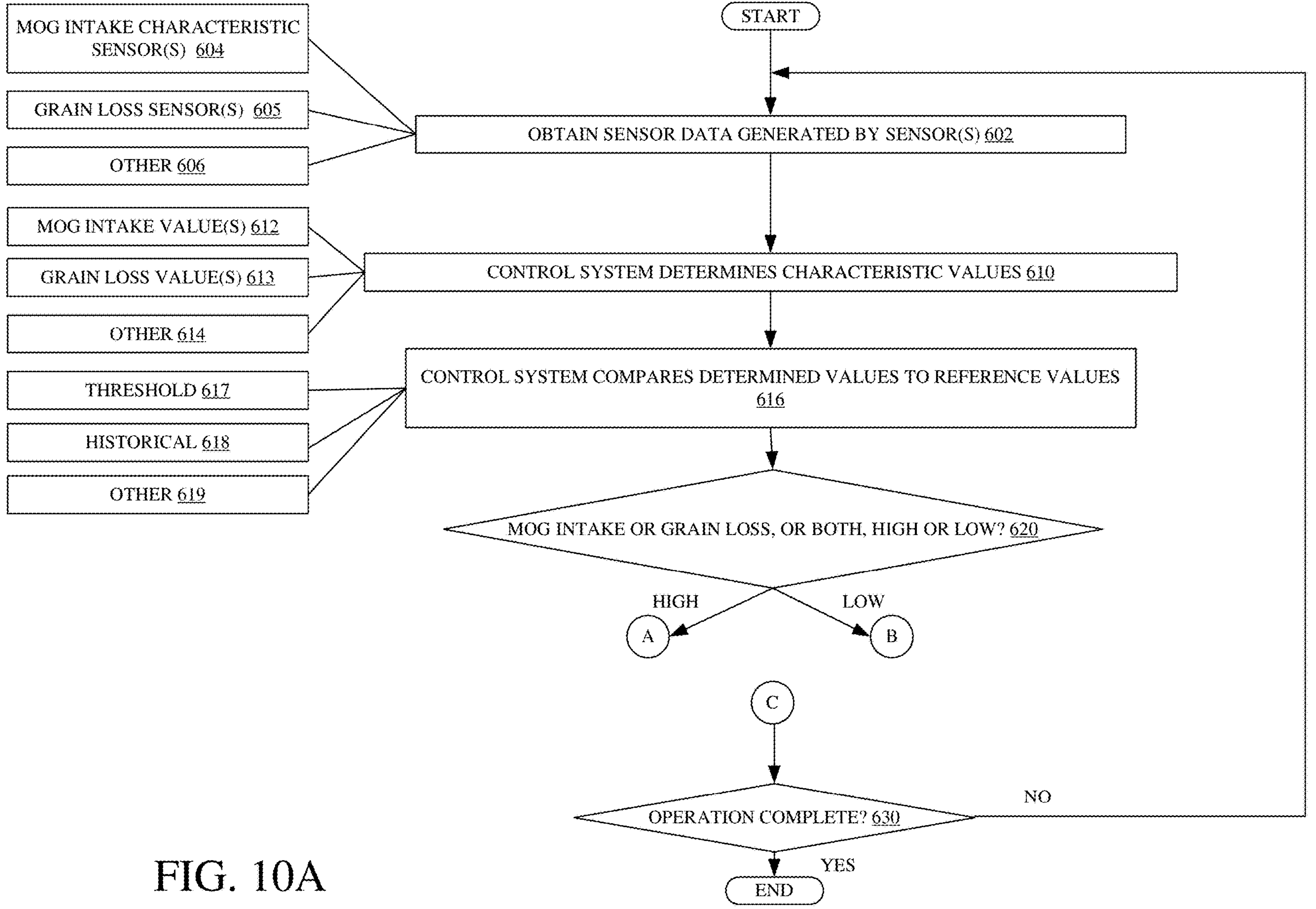
FIGS. 10A-10B (collectively referred to herein as FIG. 10) is a flow diagram illustrating one example of operation of an agricultural corn harvesting system.
Figure 10B:
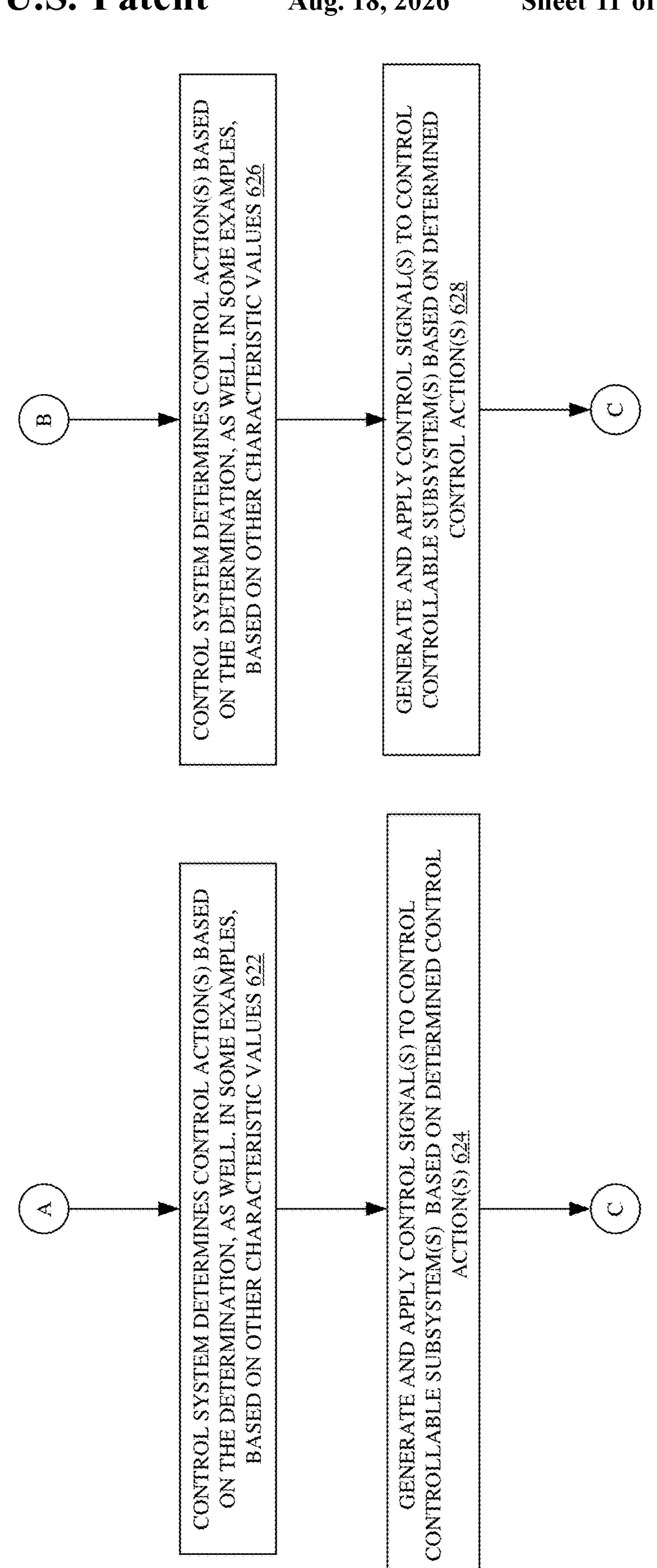

FIGS. 10A-10B (collectively referred to herein as FIG. 10) show a flow diagram illustrating one example of the operation of agricultural corn harvesting system architecture 300 in controlling harvester 100 based on sensor data generated by sensors 308.

At block 602, as harvester 100 is operating, sensors 308 generate sensor data indicative of value(s) of characteristic(s), for example, MOG intake characteristic sensors 320 generate sensor data indicative of one or more values of non-header portion MOG intake, as indicated by block 604. Additionally, non-header portion grain loss sensors 326 generate sensor data indicative of one or more values of non-header portion grain loss, as indicated by block 605. Additionally, other sensors of sensors 308, generate sensor data indicative of one or more values of one or more other characteristics as indicated by block 606. At block 606, deck plate spacing sensors 380 can generate sensor data indicative of one or more values of current spacing of one or more pairs of deck plates. At block 606, car size sensors 381 can generate sensor data indicative of one or more values of car size. At block 606, stalk diameter sensors 382 can generate sensor data indicative of one or more values of stalk diameter. At block 606, header grain loss sensors 383 can generate sensor data indicative of one or more values of header grain loss. At block 606, header MOG intake sensors 384 can generate sensor data indicative of one or more values of header MOG intake. At block 606, heading/speed sensors 325 can generate sensor data indicative of one or more values of harvester heading or harvester speed, or both. At block 606, geographic position sensors 304 can generate sensor data indicative of one or more values of harvester 100 geographic location. At block 606, one or more other sensors 329 can generate sensor data indicative of one or more values of one or more other characteristics.

At block 610, control system 314 determines values of characteristics based on the sensor data obtained at block 602. As indicated by block 612, control system 314 can determine non-header portion MOG intake values based on sensor data generated by MOG intake characteristic sensors 320. As indicated by block 613, control system 314 can determine non-header portion grain loss values based on sensor data generated by non-header portion grain loss sensors 326. As indicated by block 614, control system 314 can determine values of various other characteristics such as ear size values based on sensor data generated by car size sensors 381, stalk diameter values based on sensor data generated by stalk diameter sensors 382, heard grain loss values based on sensor data generated by grain loss sensors 383, header MOG intake values based on sensor data generated by header MOG intake sensors 384, heading/speed values based on sensor data generated by heading/speed sensors 325, geographic location values based on sensor data generated by geographic position sensors 304, as well as values of various other characteristics detected by other sensors 329.

At block 616, control system 314 compares determined values to reference values. As indicated by block 617, a reference value can be a threshold value. As indicated by block 618, a reference value can be a historical value. A reference value can be various other types of values, as indicated by block 619.

At block 616, control system 314 can compare a determined non-header portion MOG intake value to a reference non-header portion MOG intake value, such as threshold non-header portion MOG intake value or a historical non-header portion MOG intake value (e.g., a non-header portion MOG intake value previously determined during the operation). Additionally, or alternatively, control system 314 can compare a determined non-header portion grain loss value to a reference non-header portion grain loss value, such as a threshold non-header portion grain loss value or a historical non-header portion grain loss value (e.g., a non-header portion grain loss value previously determined during the operation).

At block 620 it is determined if non-header portion MOG intake or non-header portion grain loss, or both, are high. At block 620, MOG intake may be determined to be high based on the comparison to the reference value. For example, where the determined non-header portion MOG intake value meets or exceeds (e.g., is at or above) a threshold non-header portion MOG intake value, then non-header portion MOG intake may be determined as being high whereas if the determined non-header portion MOG intake value does not meet (e.g., is below) the threshold non-header portion MOG intake value then non-header portion MOG intake may be determined as being low. In another example, where the determined non-header portion MOG intake value exceeds a historical non-header portion MOG intake value (i.e., indicating that non-header portion MOG intake is increasing), then non-header portion MOG intake may be determined as being high whereas if the determined non-header portion MOG intake value is less than the historical non-header portion MOG intake value (i.e., indicating that non-header portion MOG intake is decreasing), then non-header portion MOG intake may be determined as being low. At block 620, non-header portion grain loss may be determined to be high based on the comparison to the reference value. For example, where the determined non-header portion grain loss value meets or exceeds (e.g., is at or above) a threshold non-header portion grain loss value, then non-header portion grain loss may be determined as being high whereas if the determined non-header portion grain loss value does not meet (e.g., is below) the threshold non-header portion grain loss value then grain loss may be determined as being low. In another example, where the determined non-header portion grain loss value exceeds a historical non-header portion grain loss value (i.e., indicating that non-header portion grain loss is increasing), then non-header portion grain loss May be determined as being high whereas if the determined non-header portion grain loss value is less than the historical non-header portion grain loss value (i.e., indicating that non-header portion grain loss is decreasing), then non-header portion grain loss may be determined as being low.

If, at block 620, non-header portion MOG intake or non-header portion grain loss, or both, are high then processing proceeds to block 622. If non-header portion MOG intake or non-header portion grain loss, or both, are low then processing proceeds to block 626.

At block 622, control system 314 determines control actions based on the determination that non-header portion MOG intake or non-header portion grain loss, or both, are high, as well, in some examples, based on other determined characteristic values.

Some examples of determined control actions include, but are not limited to, adjusting the spacing of one or more pairs of deck plates, adjusting header speed (or adjusting the speed of one or more components of header 104), adjusting header position, generating a display, alert, recommendation, or other indication on an interface mechanism (e.g., 318 or 364, or both) to indicate a recommended control action that should be implemented by an operator 360 or will be implemented by the control system 314 or to display the one or more determined characteristic values, or both. In other examples, determined control actions can include control of various other controllable subsystems of harvester 100, such as material handling subsystem, material transfer subsystem, cleaning subsystem, propulsion subsystem, steering subsystem, as well as various other controllable subsystems. Additionally, it will be noted that in some examples, the control action may be affected by other characteristics. For instance, the adjustment to the deck plate spacing may be limited (or may be further adjusted, such as with a subsequent control signal) by one or more of determined car size values, determined stalk size values, determined header grain loss values, or determined header MOG intake values. Additionally, the adjustment of header speed may be limited by one or more of determined ear size values, determined stalk size values, determined header grain loss values, determined header MOG intake values, or determined harvester speed. Additionally, the adjustment of header position may be limited (or may be further adjusted, such as with a subsequent control signal) by one or more of determined header grain loss values, determined header MOG intake values, or determined harvester speed.

In some examples, at block 622, only when both non-header portion grain loss and non-header portion MOG intake are determined to be high, thus indicating non-header portion grain loss due to non-header portion MOG intake, are control actions determined, such as one or more of adjusting deck plate spacing, adjusting header speed, adjusting header position, or controlling one or more other controllable subsystems. In one example, where both non-header portion MOG intake and non-header portion grain loss are high, control system 314 may determine as control action(s) one or more of increasing the spacing between one or more pairs of deck plates, increasing the header speed (e.g., increasing the speed of one or more components of header 104), or raising (increasing) the height of the header.

At block 624, control system 314 generates control signal(s) to control one or more controllable subsystems based on the control actions determined at block 622. For example, control system 314 can generate control signal(s) to control one or more deck plate actuators 354 to control a spacing of one or more pairs of deck plates. Alternatively, or additionally, control system 314 can generate control signal(s) to control one or more header position actuators 355 to control a position of the header. Alternatively, or additionally, control system 314 can generate control signal(s) to control one or more header speed actuators 350 to control a speed of one or more components of header, such as one or more gathering chains, one or more stalk rollers, or a cross auger. Alternatively, or additionally, control system 314 can generate control signal(s) to control an interface mechanism (e.g., 318 or 364, or both) to generate a display, an alert, a recommended control action, or various other indications. Additionally, or alternatively, control system can generate control signal(s) to control various other controllable subsystems, such as material handling subsystem, material transfer subsystem, cleaning subsystem, propulsion subsystem, steering subsystem, as well as various other controllable subsystems. These are merely some examples.

At block 626, control system 314 determines control actions based on the determination that non-header portion MOG intake or non-header portion grain loss, or both, are low, as well, in some examples, based on other determined characteristic values.

Some examples of determined control actions include, but are not limited to, adjusting the spacing of one or more pairs of deck plates, adjusting the position of the header, adjusting header speed (or adjusting the speed of one or more components of header 104), generating a display, alert, recommendation, or other indication on an interface mechanism (e.g., 318 or 364, or both) to indicate a recommended control action that should be implemented by an operator 360 or will be implemented by the control system 314 or to display the one or more determined characteristic values, or both. In other examples, determined control actions can include control of various other controllable subsystems of harvester 100, such as material handling subsystem, material transfer subsystem, cleaning subsystem, propulsion subsystem, steering subsystem, as well as various other controllable subsystems. Additionally, it will be noted that in some examples, the control action may be affected by other characteristics. For instance, the adjustment to the deck plate spacing may be limited by one or more of determined car size values or determined stalk size values. Additionally, the adjustment of header speed may be limited by one or more of determined car size values, determined stalk size values, or determined harvester speed.

In some examples, at block 626, only when both non-header portion grain loss and non-header portion MOG intake are determined to be low, are control actions determined, such as one or more of adjusting deck plate spacing, adjusting header speed, adjusting header position, or controlling one or more other controllable subsystems. In one example, where both non-header portion MOG intake and non-header portion grain loss are low, control system 314 may determine as control action(s) one or more of decreasing the spacing between one or more pairs of deck plates, decreasing the header speed (e.g., decreasing the speed of one or more components of header 104), or lowering (decreasing) the height of the header.

At block 628, control system 314 generates control signal(s) to control one or more controllable subsystems based on the control actions determined at block 626. For example, control system 314 can generate control signal(s) to control one or more deck plate actuators 354 to control a spacing of one or more pairs of deck plates. Alternatively, or additionally, control system 314 can generate control signal(s) to control one or more header position actuators 355 to control a position of the header. Alternatively, or additionally, control system 314 can generate control 6 signal(s) to control one or more header speed actuators 350 to control a speed of one or more components of header, such as one or more gathering chains, one or more stalk rollers, or a cross auger. Alternatively, or additionally, control system 314 can generate control signal(s) to control an interface mechanism (e.g., 318 or 364, or both) to generate a display, an alert, a recommended control action, or various other indications. Additionally, or alternatively, control system can generate control signal(s) to control various other controllable subsystems, such as material handling subsystem, material transfer subsystem, cleaning subsystem, propulsion subsystem, steering subsystem, as well as various other controllable subsystems. These are merely some examples.

Processing proceeds to block 630 where it is determined if the operation has been completed. If, at block 630, it is determined that the operation has not been completed, then processing returns to block 602. If, at block 630, it is determined that the operation has been completed, then the operation ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions 6 to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, generators, and interactions. It will be appreciated that any or all of such systems, components, logic, generators, and interactions may be implemented by hardware items, such as one or more processors, one or more processors executing computer executable instructions stored in memory, memory, or other processing components, some of which are described below, that perform the functions associated with those systems, components, logic, generators, or interactions. In addition, any or all of the systems, components, logic, generators, and interactions may be implemented by software that is loaded into a memory and is subsequently executed by one or more processors or one or more servers or other computing component(s), as described below. Any or all of the systems, components, logic, generators, and interactions May also be implemented by different combinations of hardware, software, firmware, etc., some examples of which are described below. These are some examples of different structures that may be used to implement any or all of the systems, components, logic, generators, and interactions described above. Other structures may be used as well.

Figure 11:
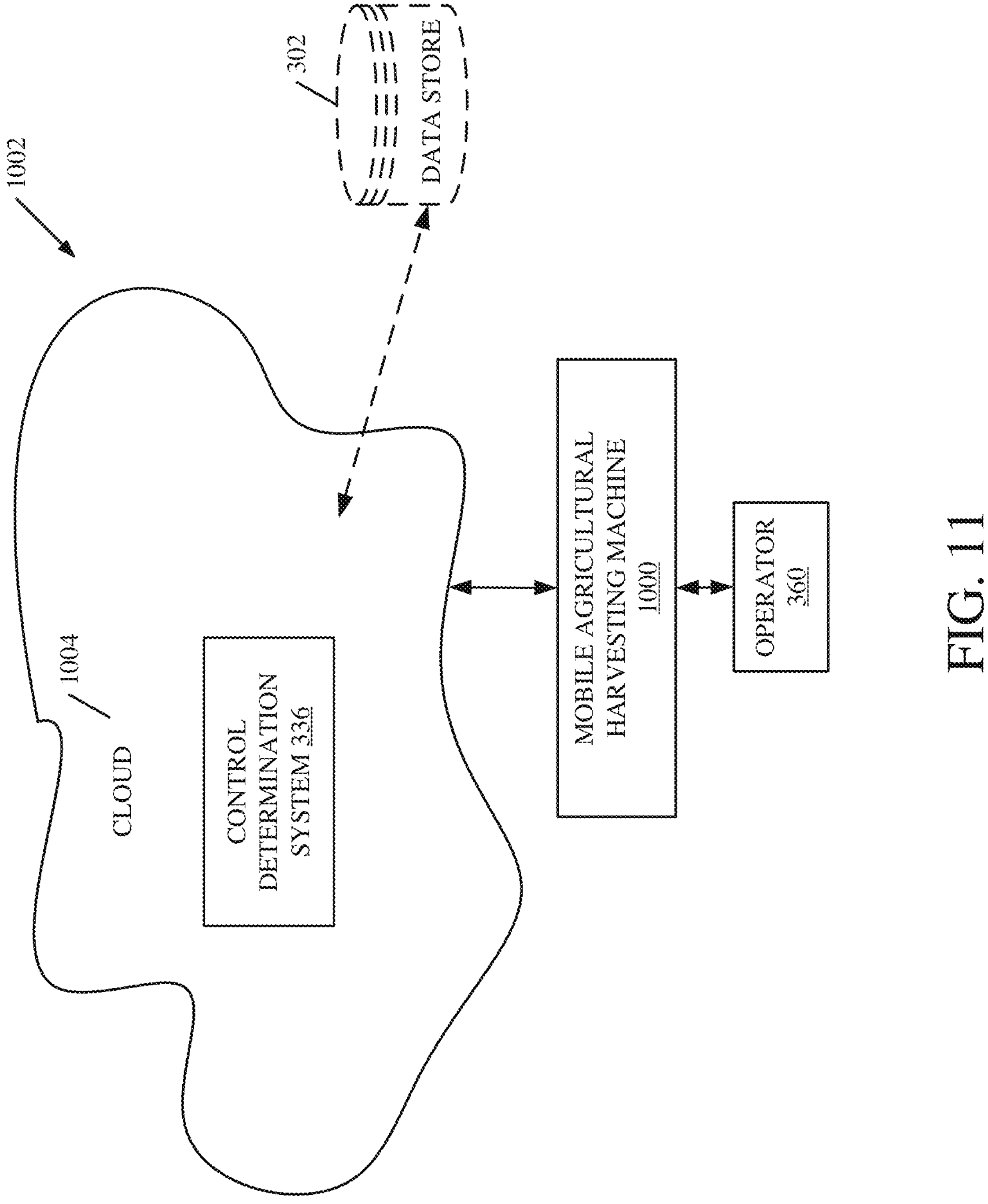
FIG. 11 is a block diagram showing one example of a mobile agricultural harvesting machine in communication with a remote server environment.

FIG. 11 is a block diagram of mobile agricultural harvesting machine 1000 (also referred to as harvester 1000), which may be similar to mobile agricultural harvesting machine 100 shown in FIG. 7. The mobile agricultural harvesting machine 1000 communicates with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 11, some items are similar to those shown in previous figures and those items are similarly numbered. FIG. 11 specifically shows that control determination system 336 may be located at a server location 1004 that is remote from the harvester 1000. Therefore, in the example shown in FIG. 11, harvester 1000 accesses systems through remote server location 1004. In other examples, various other items may also be located at server location 1004, such as data store 302, control system 314 (or components thereof), as well as various other items.

FIG. 11 also depicts another example of a remote server architecture. FIG. 11 shows that some elements of previous figures may be disposed at a remote server location 1004 while others may be located elsewhere. By way of example, data store 302 may be disposed at a location separate from location 1004 and accessed via the remote server at location 1004. Regardless of where the elements are located, the elements can be accessed directly by harvester 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the harvester 1000 comes close to the machine containing the information collection system, such as a fuel truck prior to fueling, the information collection system collects the information from the harvester 1000 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the harvester 1000 until the harvester 1000 enters an area having wireless communication coverage. The harvester 1000, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 12:
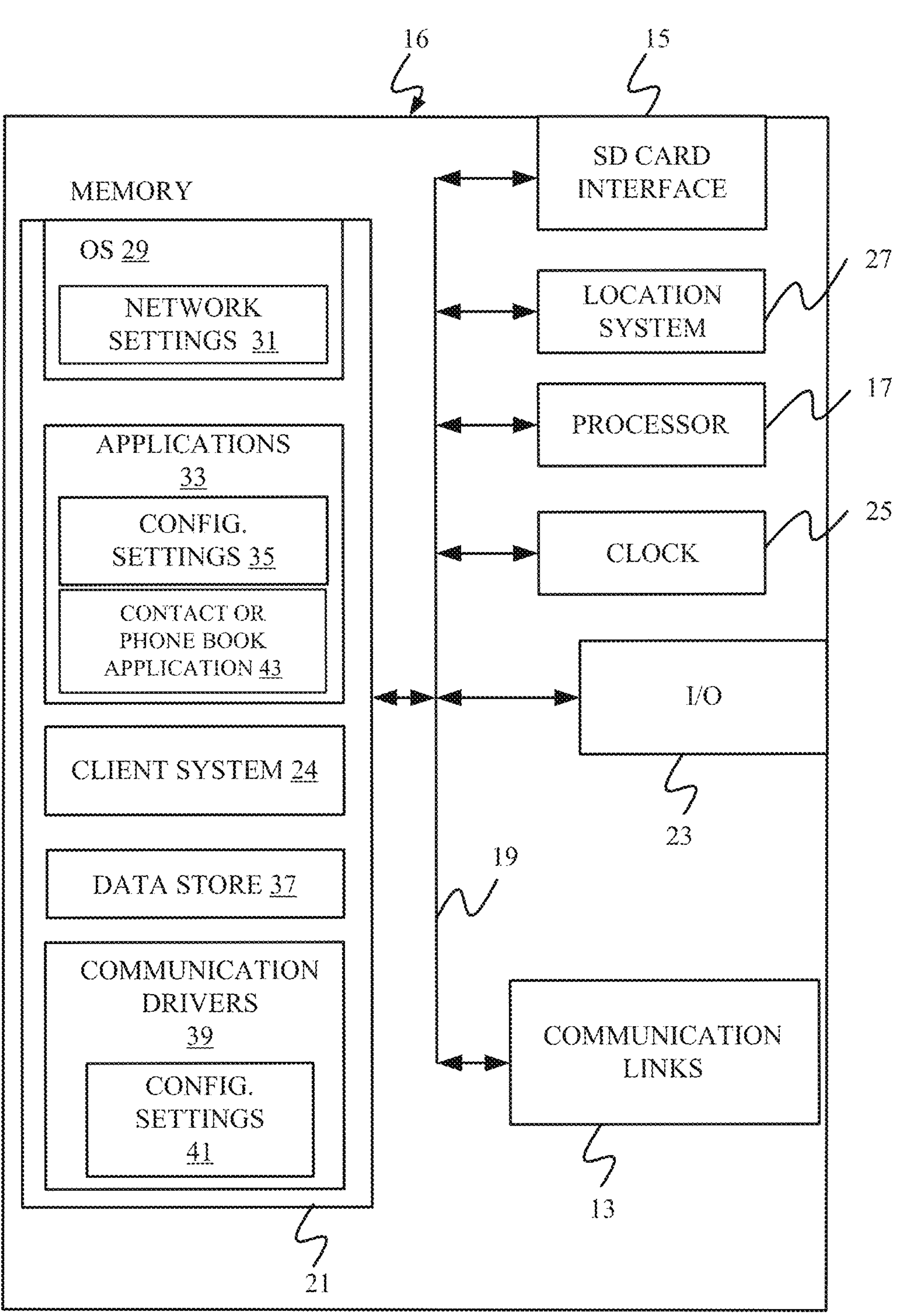
FIGS. 12-14 show examples of mobile devices that can be used in an agricultural harvesting system.
Figure 13:
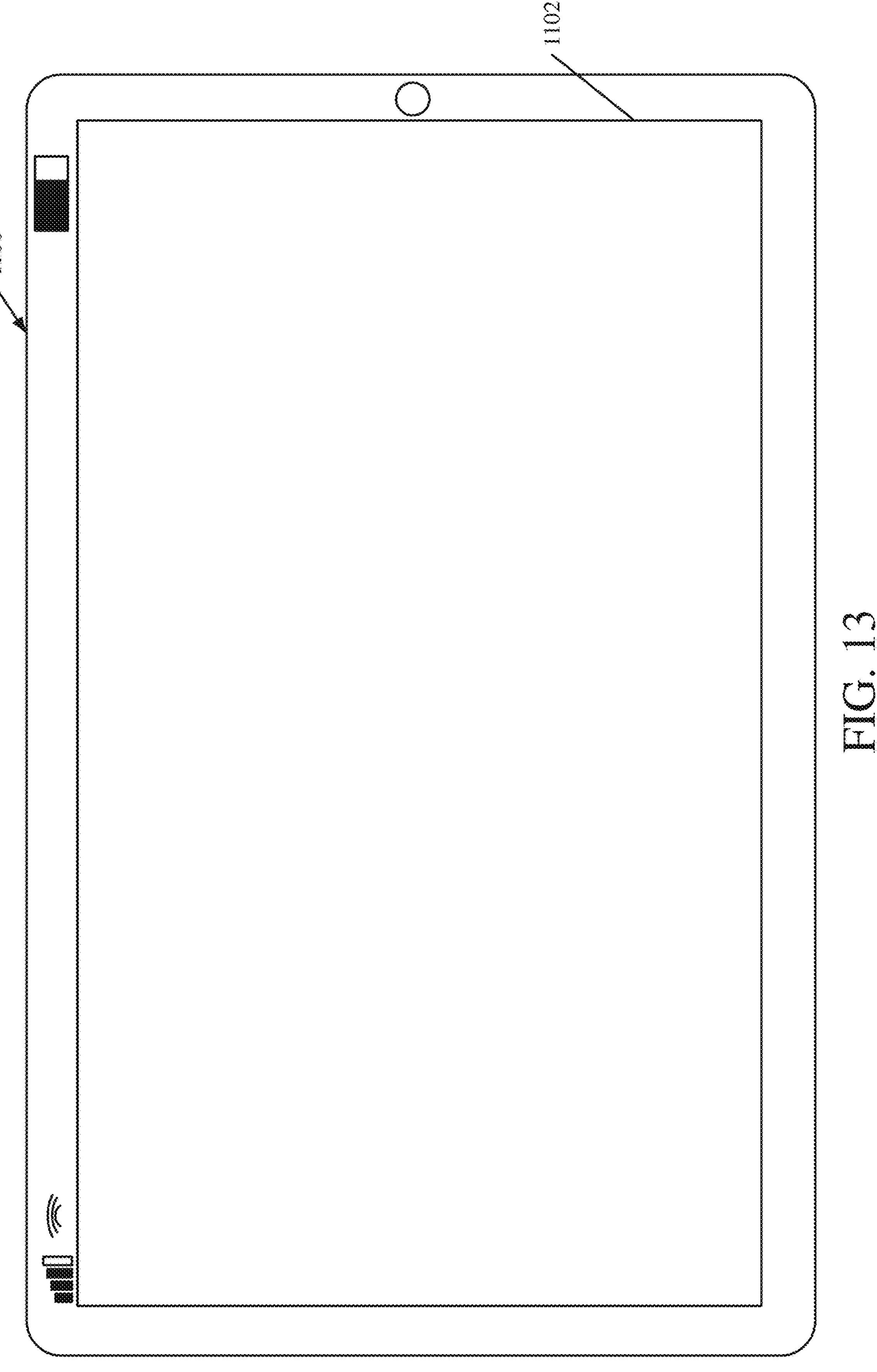
Figure 14:
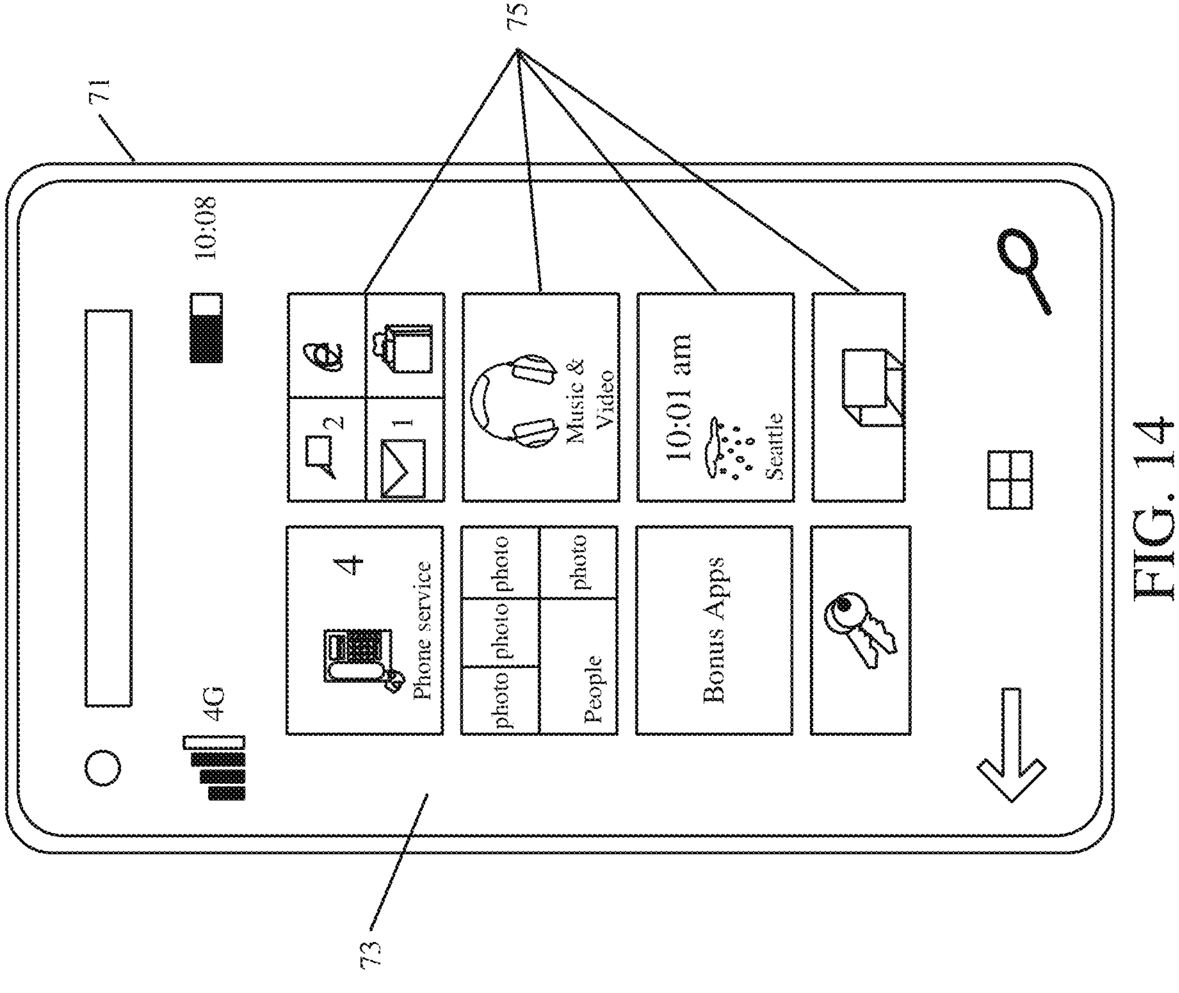

FIG. 12 is a simplified block diagram of one illustrative example of a handheld or mobile computing device that can be used as a user's or client's handheld device 16, in which the present system (or parts of it) can be deployed. For instance, a mobile device can be deployed in the operator compartment of harvester 100 for use in providing or implementing functionality discussed herein. FIGS. 13-14 are examples of handheld or mobile devices.

FIG. 12 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures described herein) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 13 shows one example in which device 16 is a tablet computer 1100. In FIG. 13, computer 1100 is shown with user interface display screen 1102. Screen 1102 can be a touch screen or a pen-enabled interface that receives inputs from a pen or stylus. Tablet computer 1100, may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 14 is similar to FIG. 13 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
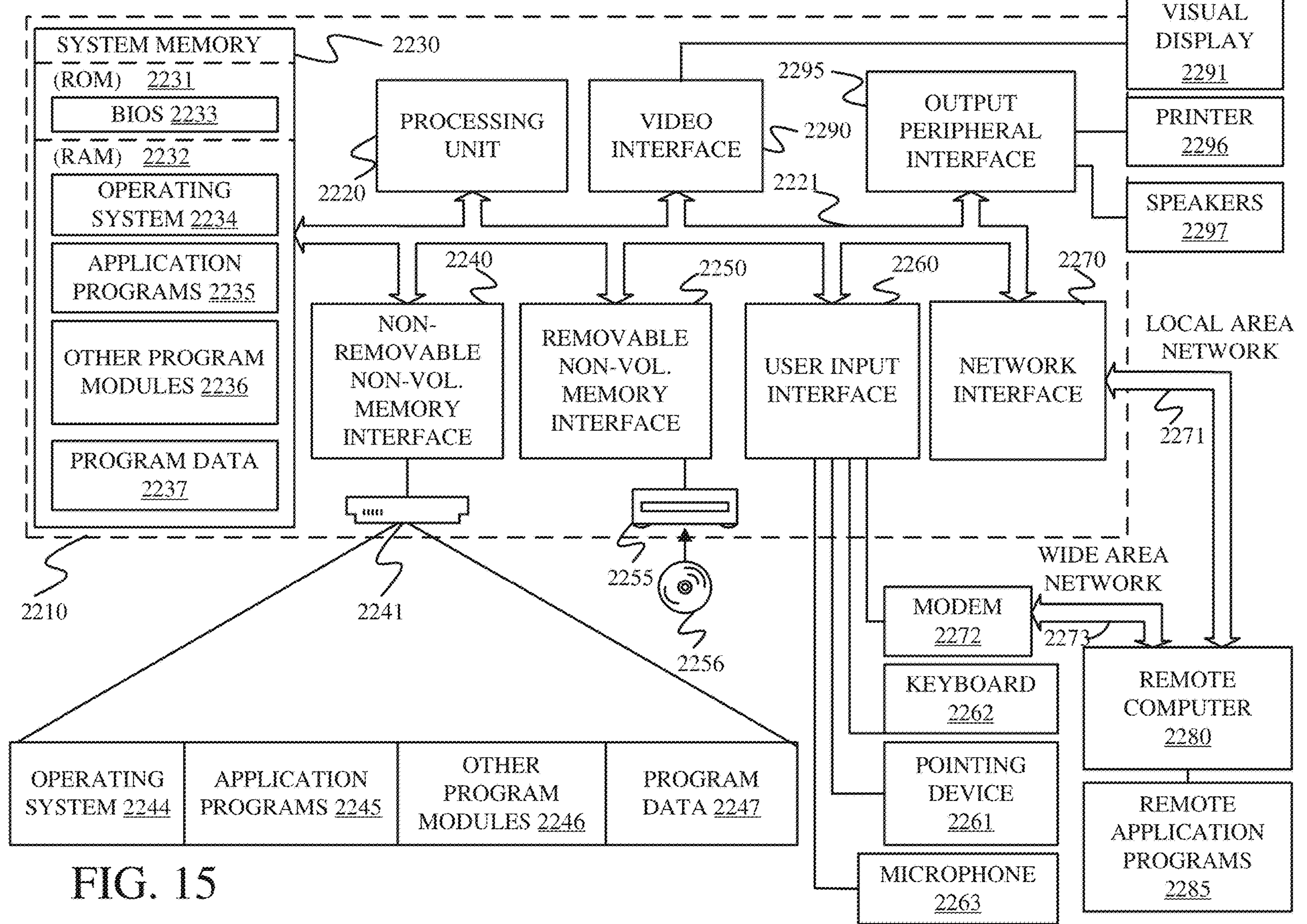
FIG. 15 is a block diagram showing one example of a computing environment that can be used in an agricultural harvesting system.

FIG. 15 is one example of a computing environment in which elements of previous figures described herein can be deployed. With reference to FIG. 15, an example system for implementing some embodiments includes a computing device in the form of a computer 2210 programmed to operate as discussed above. Components of computer 2210 may include, but are not limited to, a processing unit 2220 (which can comprise processors or servers from previous figures described herein), a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. Memory and programs described with respect to previous figures described herein can be deployed in corresponding portions of FIG. 15.

Computer 2210 typically includes a variety of computer readable media. Computer readable media may be any available media that can be accessed by computer 2210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 2230 includes computer storage media in the form of volatile and/or nonvolatile memory or both such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data or program modules or both that are immediately accessible to and/or presently being operated on by processing unit 2220. By way of example, and not limitation, FIG. 15 illustrates operating system 2234, application programs 2235, other program modules 2236, and program data 2237.

The computer 2210 may also include other removable/non-removable volatile/nonvolatile computer storage media. By way of example only, FIG. 15 illustrates a hard disk drive 2241 that reads from or writes to non-removable, nonvolatile magnetic media, an optical disk drive 2255, and nonvolatile optical disk 2256. The hard disk drive 2241 is typically connected to the system bus 2221 through a non-removable memory interface such as interface 2240, and optical disk drive 2255 are typically connected to the system bus 2221 by a removable memory interface, such as interface 2250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 2210. In FIG. 15, for example, hard disk drive 1241 is illustrated as storing operating system 2244, application programs 2245, other program modules 2246, and program data 2247. Note that these components can either be the same as or different from operating system 2234, application programs 2235, other program modules 2236, and program data 2237.

A user may enter commands and information into the computer 2210 through input devices such as a keyboard 2262, a microphone 2263, and a pointing device 2261, such as a mouse, trackball or touch pad. Other input devices (not shown) may include a joystick, game pad, satellite dish, scanner, or the like. These and other input devices are often connected to the processing unit 2220 through a user input interface 2260 that is coupled to the system bus, but may be connected by other interface and bus structures. A visual display 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 is operated in a networked environment using logical connections (such as a controller area network-CAN, local area network-LAN, or wide area network WAN) to one or more remote computers, such as a remote computer 2280.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. In a networked environment, program modules may be stored in a remote memory storage device. FIG. 15 illustrates, for example, that remote application programs 2285 can reside on remote computer 2280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A mobile agricultural harvester comprising:

a non-header portion;

a header coupled to the non-header portion;

a first material other than grain (MOG) intake characteristic sensor, disposed on the non-header portion, configured to:

detect a first MOG intake characteristic, indicative of MOG intake, at a first location; and generate first MOG intake sensor data indicative of a first MOG intake value based on the first MOG intake characteristic at the first location;

a second MOG intake characteristic sensor configured to:

detect a second MOG intake characteristic indicative of MOG intake at a second location that is outside of the non-header portion and spaced apart from the first location; and generate second MOG intake sensor data indicative of a second MOG intake value based on the second MOG intake characteristic at the second location; and a control system configured to:

aggregate the first MOG intake value and the second MOG intake value to generate an aggregate MOG intake value;

generate a comparison result indicative of a comparison of the aggregate MOG intake value to a threshold intake value; and control the mobile agricultural harvester based on the comparison result.

2. The mobile agricultural harvester of claim 1, wherein the first MOG intake characteristic sensor is one of: (i) a sensor configured to detect, as the first MOG intake characteristic within the non-header portion, an amount of MOG within a cleaning system of the mobile agricultural harvester; (ii) a sensor configured to detect, as the first MOG intake characteristic within the non-header portion, an amount of force used to drive a crop processing component within the non-header portion; and (iii) a sensor configured to detect, as the first MOG intake characteristic within the non-header portion, an amount of MOG within or provided to a clean grain tank of the non-header portion; and wherein the second MOG intake characteristic sensor is one of: (iv) a sensor configured detect, as the second MOG intake characteristic outside of the non-header portion; an amount of MOG expelled by the mobile agricultural harvester; and (v) a sensor configured to detect, as the second MOG intake characteristic, an amount of MOG on the header.

3. The mobile agricultural harvester of claim 1 and further comprising:

a deck plate actuator configured to control a spacing between a pair of deck plates of the header and wherein the control system is further configured to control the deck plate actuator to adjust the spacing between the pair of deck plates of the header based on the MOG intake sensor data.

4. The mobile agricultural harvester of claim 1 and further comprising:

a grain loss sensor configured to detect a characteristic indicative of grain loss and generate grain loss sensor data indicative of a grain loss value;

a header speed actuator configured to control a speed of a component of the header; and wherein the control system is further configured to control the header speed actuator to adjust the speed of the component of the header based on the MOG intake sensor data and the grain loss sensor data.

5. The mobile agricultural harvester of claim 1, and further comprising a header speed actuator configured to control a speed of a component of the header, wherein the control system is further configured to:

determine the first MOG intake value based on the first MOG intake sensor data;

compare the first MOG intake value to a first MOG intake value threshold; and control the header speed actuator to adjust the speed of the component of the header based on the comparison.

6. The mobile agricultural harvester of claim 1, and further comprising a header speed actuator configured to control a speed of a component of the header, wherein the control system is further configured to:

determine the first MOG intake value based on the MOG intake sensor data;

compare the first MOG intake value to a previous value of MOG intake detected during operation of the mobile agricultural harvester; and control the header speed actuator to adjust the speed of the component of the header based on the comparison.

7. The mobile agricultural harvester of claim 4, wherein the grain loss sensor comprises a first grain loss sensor configured to detect a first characteristic within the non-header portion and generate first grain loss sensor data indicative of a first grain loss value, the mobile agricultural harvester further comprising:

a second grain loss sensor configured to detect a second characteristic outside of the non-header portion and generate second grain loss sensor data indicative of a second grain loss value; and wherein the control system is further configured to control the header speed actuator to adjust the speed of the component of the header based on the MOG intake sensor data, the first grain loss sensor data, and the second grain loss sensor data.

8. The mobile agricultural harvester of claim 1, and further comprising:

a header speed actuator configured to control a speed of a component of the header;

a characteristic sensor configured to detect a characteristic and generate characteristic sensor data indicative of a value of the characteristic;

wherein the control system is further configured to control the header speed actuator to adjust the speed of the component of the header based on the characteristic sensor data; and wherein the characteristic sensor comprises one of:

a sensor configured to detect, as the characteristic, ear size and to generate, as the characteristic sensor data, characteristic sensor data indicative of a value of ear size; or a sensor configured to detect, as the characteristic, stalk diameter and to generate, as the characteristic sensor data, characteristic sensor data indicative of a value of stalk diameter.

9. A computer implemented method of controlling a mobile agricultural harvester, the computer implemented method comprising:

detecting, with a grain loss sensor, a characteristic indicative of grain loss;

determining a grain loss value based on the detected characteristic indicative of grain loss;

detecting, with a first material other than grain (MOG) intake characteristic sensor disposed on the mobile agricultural harvester, a first MOG intake characteristic outside of a non-header portion, the first MOG intake characteristic comprising at least one of:

an amount of MOG expelled by the mobile agricultural harvester, or an amount of MOG on a header coupled to the non-header portion of the mobile agricultural harvester; and determining a first MOG intake value based on the first MOG intake characteristic;

detecting, with a second MOG intake characteristic sensor disposed on the non-header portion, a second MOG intake characteristic different than the first MOG intake characteristic;

determining a second MOG intake value based on the second MOG intake characteristic; and controlling a header speed actuator of the mobile agricultural harvester to adjust a speed of a component of the header and controlling a deck plate actuator of the mobile agricultural harvester to control a spacing between a pair of deck plates of the header of the mobile agricultural harvester based on the first MOG intake value, the second MOG intake value, and the grain loss value.

10. The computer implemented method of claim 9, further comprising:

determining, based on sensor data generated by a plurality of sensors on the non-header portion, two or more of: (i) a grain loss value; (ii) a grain quality value; and (iii) a header MOG intake value; and controlling the header speed actuator of the mobile agricultural harvester to adjust the speed of the component of the header based on the two or more of:

(i) the grain loss value; (ii) the grain quality value; and (iii) the header MOG intake value.

11. An agricultural corn harvesting system comprising:

a non-header portion;

a corn header coupled to the non-header portion;

a deck plate actuator configured to control a spacing between a pair of deck plates;

a header speed actuator configured to control a speed of a component of the corn header;

a first material other than grain (MOG) intake characteristic sensor, disposed on the non-header portion, configured to detect a first MOG intake characteristic within the non-header portion indicative of MOG intake and generate first sensor data indicative of a first MOG intake value;

a second MOG intake characteristic sensor configured to detect, at a location outside of the non-header portion, a second MOG intake characteristic indicative of MOG intake and generate second sensor data indicative of a second MOG intake value;

a grain loss sensor configured to detect a characteristic indicative of grain loss and generate grain loss sensor data indicative of a grain loss value; and a control system configured to:

aggregate the first MOG intake value and the second MOG intake value to generate an aggregate MOG intake value;

generate a first comparison result indicative of a comparison of the aggregate MOG intake value to a threshold intake value;

generate a second comparison result indicative of a comparison of the grain loss value to a threshold grain loss value;

determine a control action based on the first comparison result and the second comparison result; and control at least one of the deck plate actuator or the header speed actuator based on the control action.

12. The agricultural corn harvesting system of claim 11, wherein the grain loss sensor comprises a first grain loss sensor configured to detect a first characteristic indicative of grain loss corresponding to the non-header portion and generate first grain loss sensor data indicative of a first grain loss value, the agricultural corn harvesting system further comprising:

a second grain loss sensor configured to detect a second characteristic indicative of grain loss corresponding to the corn header and generate second grain loss sensor data indicative of a second grain loss value; and wherein the control system is further configured to determine the control action based on the first MOG intake value, the second MOG intake value, the first grain loss value, and the second grain loss value.

13. The agricultural corn harvesting system of claim 12 and further comprising:

a sensor configured to detect a characteristic and generate characteristic sensor data indicative of a value of the characteristic, wherein the control system is further configured to determine the control action based on the first MOG intake value, the second MOG intake value, the first grain loss value, the second grain loss value, and the value of the characteristic, and wherein the sensor comprises one of:

an ear size sensor configured to detect, as the characteristic, ear size and to generate, as the characteristic sensor data, ear size sensor data indicative of, as the value of the characteristic, a value of ear size;

a stalk diameter sensor configured to detect, as the characteristic, stalk diameter and to generate, as the characteristic sensor data, stalk diameter sensor data indicative of, as the value of the characteristic, a value of stalk diameter; or a grain quality sensor configured to detect, as the characteristic, grain quality and to generate, as the characteristic sensor data, grain quality sensor data indicative of, as the value of the characteristic, a value of grain quality.

14. The agricultural corn harvesting system of claim 11 and further comprising a header height actuator configured to control a height of the corn header, wherein the control system is further configured to:

control at least one of the deck plate actuator, the header speed actuator, or the header height actuator based on the control action.

15. The mobile agricultural harvester of claim 1, wherein the second MOG intake characteristic sensor is configured to detect an amount of MOG on the header, and wherein the second MOG intake value is based on the detected amount of MOG on the header.

16. The mobile agricultural harvester of claim 1, wherein the second MOG intake characteristic is different than the first MOG intake characteristic, and each characteristic, of the first MOG intake characteristic and the second MOG intake characteristic, comprises at least one of non-header portion MOG intake, MOG output, MOG load, non-header portion grain loss, or grain quality.

* * * * *